US011917666B2

(12) United States Patent
Nguyen et al.

(10) Patent No.: US 11,917,666 B2
(45) Date of Patent: Feb. 27, 2024

(54) SIDELINK CONTROL INFORMATION FORWARDING FOR SENSING PROCEDURE

(71) Applicant: QUALCOMM Incorporated, San Diego, CA (US)

(72) Inventors: Tien Viet Nguyen, Bridgewater, NJ (US); Sourjya Dutta, San Diego, CA (US); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 17/481,632

(22) Filed: Sep. 22, 2021

(65) Prior Publication Data

US 2022/0132514 A1 Apr. 28, 2022

Related U.S. Application Data

(60) Provisional application No. 63/106,799, filed on Oct. 28, 2020.

(51) Int. Cl.
*H04W 4/00* (2018.01)
*H04W 72/541* (2023.01)
(Continued)

(52) U.S. Cl.
CPC ......... *H04W 72/541* (2023.01); *H04L 1/0003* (2013.01); *H04W 72/02* (2013.01);
(Continued)

(58) Field of Classification Search
CPC .............................. H04W 72/02; H04W 72/04
See application file for complete search history.

(56) References Cited

U.S. PATENT DOCUMENTS 11,115,890 B2 * 9/2021 Lee ..................... H04W 4/40
2018/0270822 A1 9/2018 Chae
(Continued)

OTHER PUBLICATIONS

International Search Report and Written Opinion dated Feb. 8, 2022 from Correponding PCT Application No. PCT/US2021/071576.
(Continued)

*Primary Examiner* — Mohammad S Adhami
*Assistant Examiner* — Elisabeth Benoit Magloire
(74) *Attorney, Agent, or Firm* — Arent Fox, LLP

(57) ABSTRACT

Apparatus, methods, and computer-readable media for sidelink control information forwarding for sensing procedure are disclosed herein. An example method of wireless communication at a forwarding user equipment (UE) includes receiving, from a forwarded UE, control information, and transmitting, to a sensing UE, a forward message including the control information and information associated with the forwarded UE. An example method of wireless communication at the sensing UE includes receiving, from the forwarding UE, a forward message including the control information containing a first measurement of the control information. The example method also includes obtaining a second measurement of the forward message and determining a ratio of the second measurement to the first measurement. The example method also includes selecting a specific resource based on the ratio and whether the forwarding UE is an intended receiver for the sensing UE or the forwarding UE intends to receive from the forwarded UE.

38 Claims, 11 Drawing Sheets

(51) Int. Cl.
  *H04L 1/00* (2006.01)
  *H04W 72/02* (2009.01)
  *H04W 72/20* (2023.01)
  *H04W 72/51* (2023.01)
  *H04W 72/542* (2023.01)

(52) U.S. Cl.
  CPC ........... *H04W 72/20* (2023.01); *H04W 72/51* (2023.01); *H04W 72/542* (2023.01)

(56) References Cited

U.S. PATENT DOCUMENTS

| | | | |
|---|---|---|---|
| 2019/0208441 A1* | 7/2019 | Wang | H04W 24/10 |
| 2020/0229145 A1* | 7/2020 | Kang | H04W 72/23 |
| 2021/0127365 A1* | 4/2021 | Wang | H04W 72/02 |
| 2021/0219268 A1* | 7/2021 | Li | H04W 72/20 |
| 2021/0409990 A1* | 12/2021 | Wang | H04W 24/10 |
| 2022/0264478 A1* | 8/2022 | Miao | H04L 5/0051 |
| 2022/0295411 A1* | 9/2022 | Fodor | H04W 52/383 |
| 2022/0322359 A1* | 10/2022 | Ye | H04W 72/02 |
| 2022/0338202 A1* | 10/2022 | Kim | H04W 8/00 |

OTHER PUBLICATIONS

Ericsson: Discovery Channel Design for 3GPP Draft; R1-135810 D2D Discovery Design, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; Nov. 11, 2013-Nov. 15, 2013 Nov. 13, 2013 (Nov. 13, 2013), XP050735451.

Item 2 Continued: Retrieved from the Internet: URL:http://www.3gpp.org/ftp/Meetings_3GPP_SYNC/RAN/RAN1/Docs/ [retrieved on Nov. 13, 2013] 5.2 Control Information Relayed by the UEs.

* cited by examiner

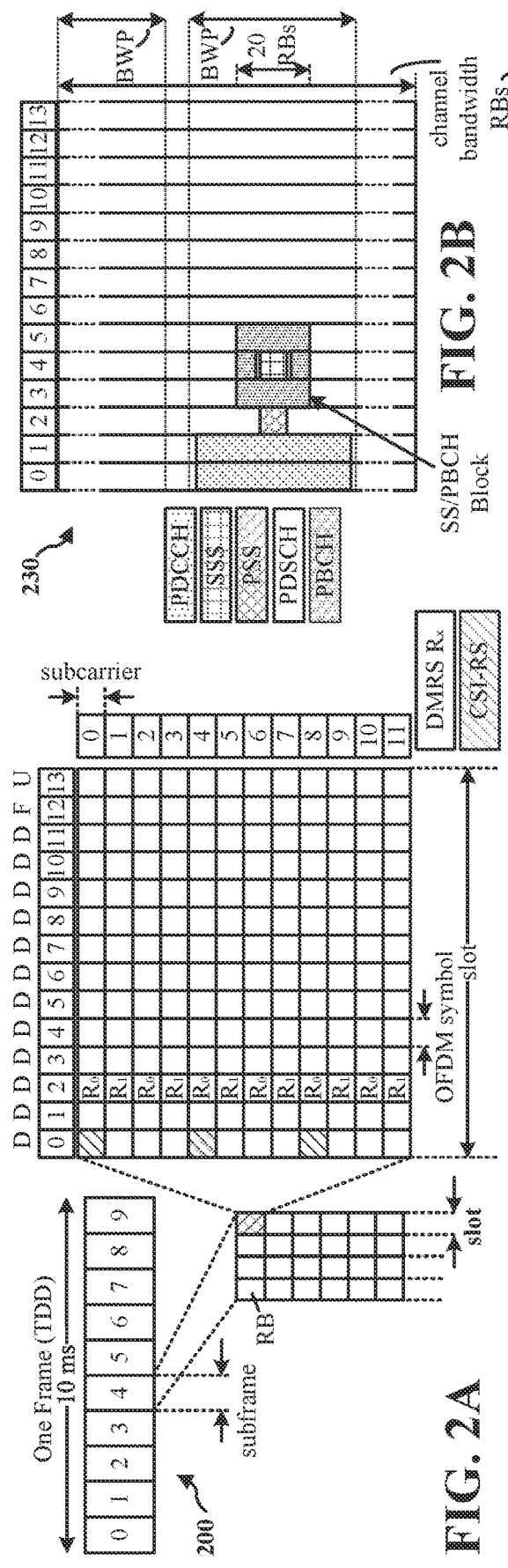
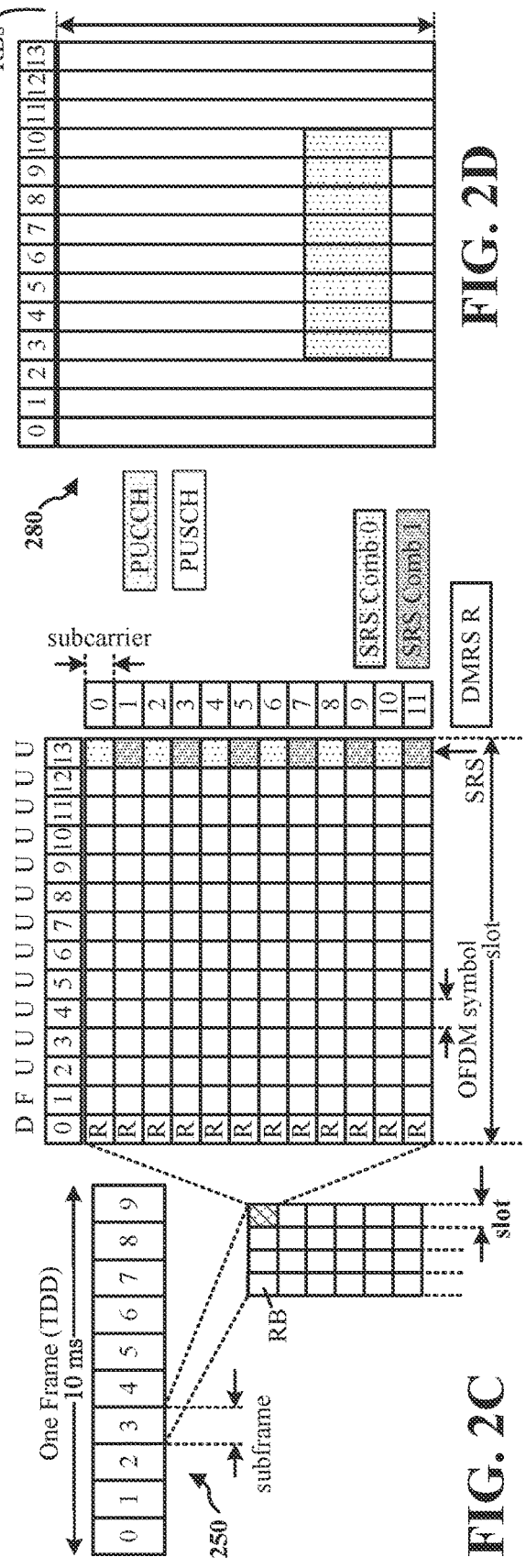
FIG. 2A
FIG. 2B
FIG. 2C
FIG. 2D

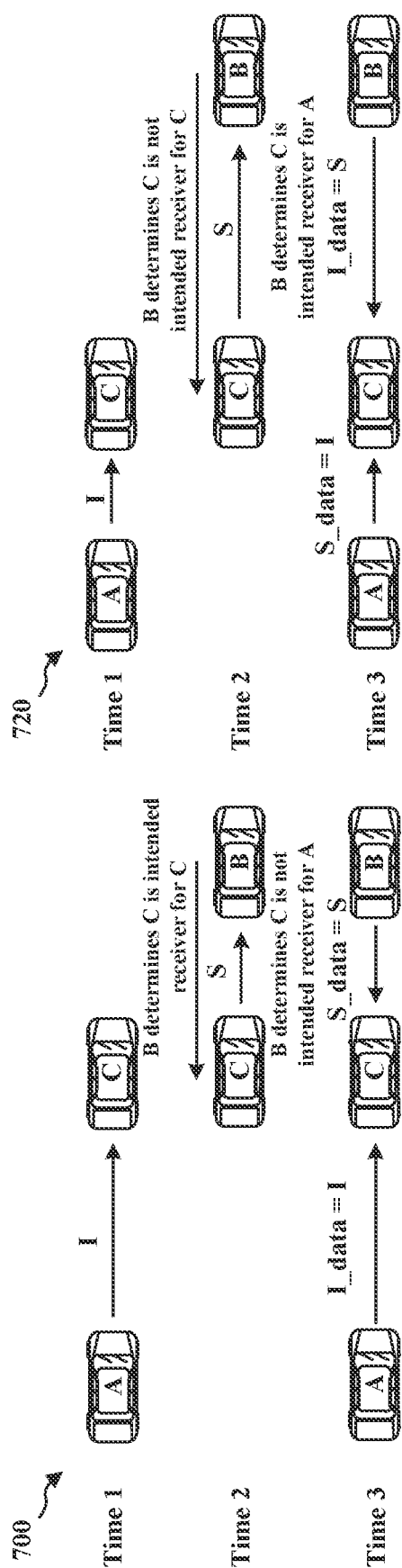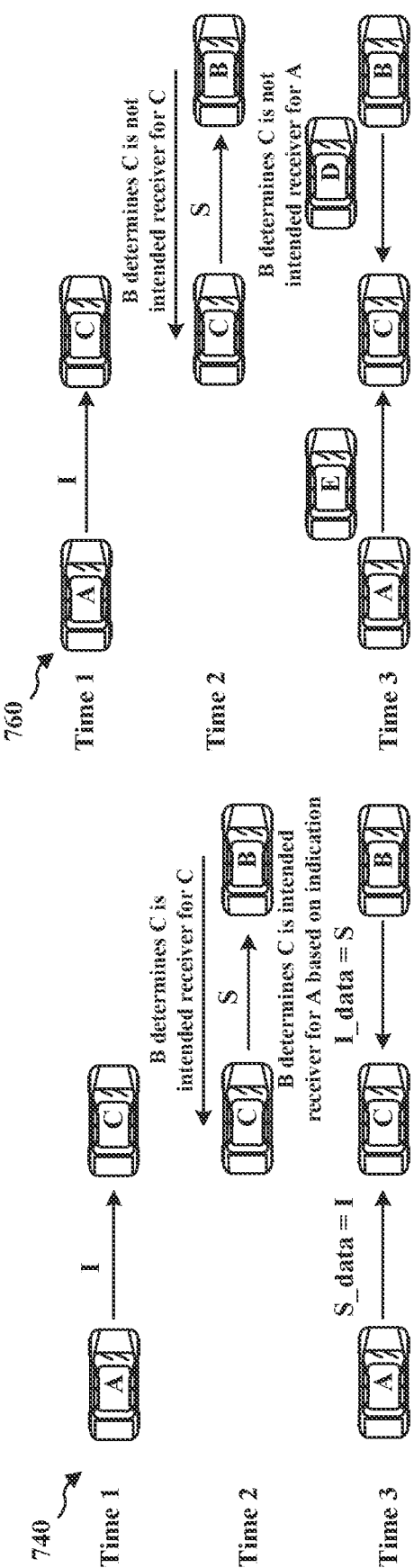

SIDELINK CONTROL INFORMATION FORWARDING FOR SENSING PROCEDURE

CROSS REFERENCE TO RELATED APPLICATION(S)

This application claims the benefit of U.S. Provisional Patent Application Ser. No. 63/106,799, entitled "SIDELINK CONTROL INFORMATION FORWARDING FOR SENSING PROCEDURE" and filed on Oct. 28, 2020, which is expressly incorporated by reference herein in its entirety.

BACKGROUND

Technical Field

The present disclosure generally relates to communication systems, and more particularly, to sidelink control information forwarding for sensing procedure for vehicle-to-everything (V2X) or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Aspects of wireless communication may include direct communication between devices, such as in V2X and/or other D2D communication. There exists a need for further improvements in V2X and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For sidelink communications with certain reliability requirements that experience a hidden node interference, a transmitter UE may not receive sidelink control information (SCI) of a transmitter located on a non-line-of-sight path (e.g., the hidden node), which may interfere with one or more intended receivers of a data transmission. For example, the transmitter UE may select resources that overlap with reserved resources of the transmitter, however, the transmitter UE may not become aware of the reserved resources The transmitter UE may not be able to decode the SCI of the transmitter due to signal strength issues (e.g., SINR) or traffic configuration (e.g., half duplex).

Sensing performance for sidelink communication may be improved by configuring a receiver UE to forward the SCI of a first transmitter UE to a second transmitter UE. In this regard, the second transmitter UE (denoted as a sensing UE) can discover which resources may have already been reserved by the first transmitter UE (denoted as a forwarded UE) and determine whether the reserved resources are to be avoided for use in a transmission based on the receiver status of the receiver UE (denoted as a forwarding UE). In various aspects, transmitter UEs may transmit on partial bandwidth, which can allow the first transmitter UE and the second transmitter to transmit at the same time (e.g., during a same slot) using non overlapping resource block (RB) resources. However, an IBE collision may occur when the first transmitter UE (located near the receiver UE) transmits at the same time as a transmission intended for the receiver UE from the second transmitter UE (located farther from the receiver UE), although both transmissions are carried on non-overlapping RB frequency resources. In this case, IBE from the first transmitter is still strong enough to interfere with the signal from the second transmitter.

The present disclosure provides for techniques in facilitating sidelink control information forwarding for sensing procedure in sidelink communication. The sensing UE (the second transmitter UE) can protect its own transmission by ensuring that the receiver UE is it's intended receiver to avoid any false alarms and potential waste of resources. The sensing UE also can protect the transmission of the forwarded UE (the first transmitter UE) by ensuring whether the receiver UE is its intended receiver or it instead intends to receive from the forwarded UE. The sensing UE can protect its own transmission and the transmission of the forwarded UE by avoiding an overlap of time resources and/or frequency resources between the transmissions.

In an approach to improve the sidelink sensing procedure, the sensing may be based on a signal-to-interference ratio (SIR) measurement, where S is the measured reference signal received power (RSRP) from the receiver UE to the second transmitter UE, I is the measured RSRP from the first transmitter UE to the receiver UE, and SIR is the ratio of S to I. The SIR measurement can indicate how strong the interference would be if the second transmitter UE transmits on the forwarded resources (e.g., the reserved resources of the forwarded UE). In this regard, the second transmitter UE may avoid selecting overlapping resources when the SIR measurement is below a certain threshold. The present disclosure provides additional thresholds to help protect the transmissions of both the sensing UE and the forwarded UE. For example, the second transmitter UE may avoid overlapping in time with the first transmitter to minimize any IBE impact from the first transmitter by selecting non-overlapping time resources to transmit to the receiver UE (as the intended receiver of the second transmitter UE) when the SIR measurement is below a first threshold and/or a third threshold (when IBE from the first transmitter UE is higher). In another example, the second transmitter UE may avoid overlapping in time with the first transmitter to prevent any IBE impact onto the first transmitter by selecting non-overlapping time resources to transmit to the receiver UE (as the intended receiver of the first transmitter UE) when the SIR measurement is above a second threshold and/or a fourth threshold (when IBE from the second transmitter UE is higher).

In an aspect of the disclosure, a method, a computer-readable medium, and an apparatus are provided. The apparatus is configured to receive, from a second UE over a sidelink channel, control information. The apparatus can transmit, to a third UE over a sidelink channel, a forward message comprising the control information and information associated with the first UE.

In an aspect of the disclosure, a method, a computer-readable medium, and an apparatus are provided. The apparatus is configured to receive, from a second UE over a sidelink channel, a forward message comprising control information associated with a third UE, the control information comprising a first measurement of the control information. The apparatus can obtain a second measurement of the forward message. The apparatus can determine a ratio of the second measurement to the first measurement. The apparatus can select a specific resource based on the ratio and whether the second UE is an intended receiver for the first UE or the second UE intends to receive from the third UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 7A-7D illustrate examples of sidelink control information forwarding for sensing procedure in sidelink communication, in accordance with aspects presented herein.

DETAILED DESCRIPTION

Figure 1:
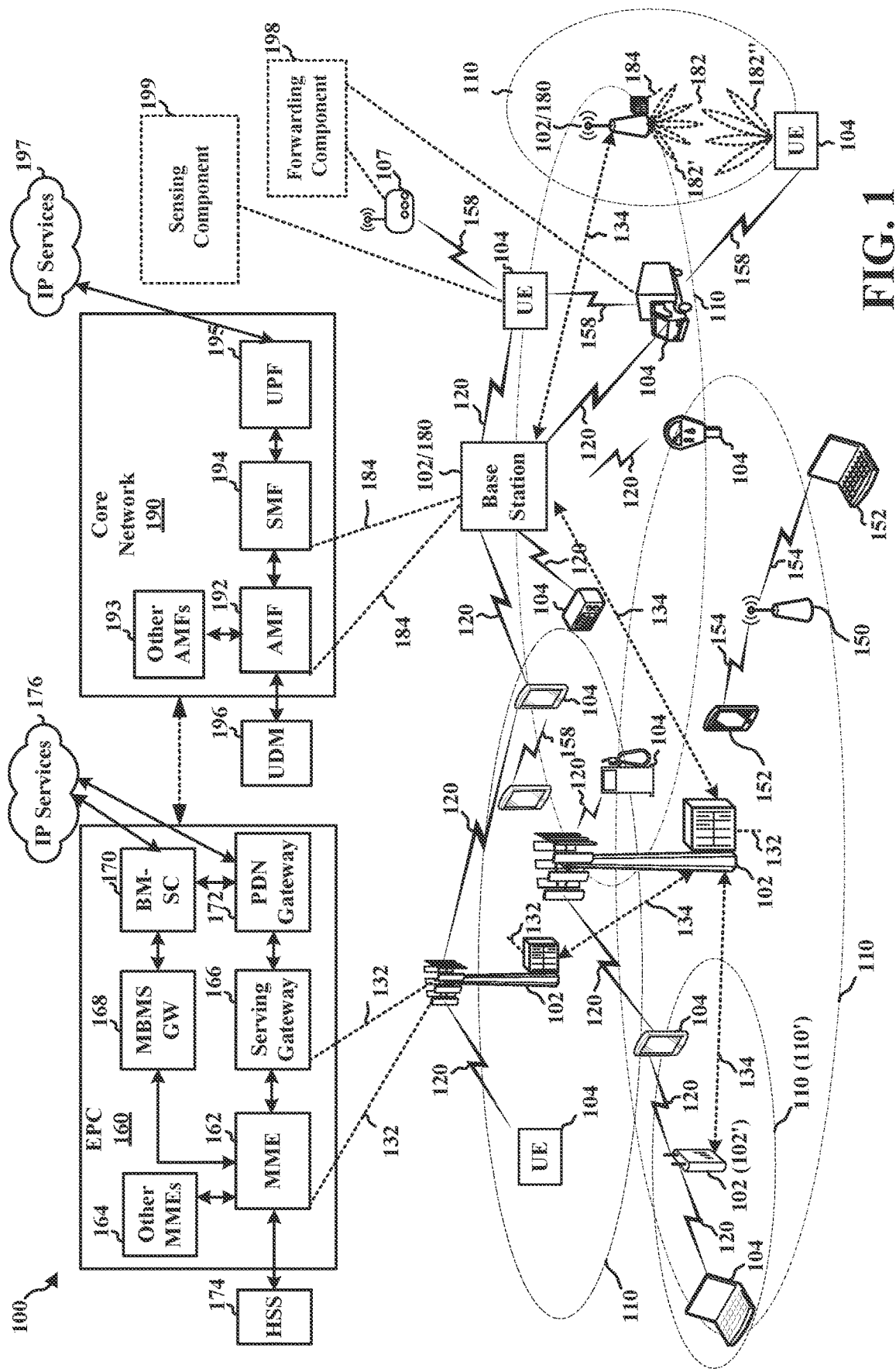
FIG. 1 is a diagram illustrating an example of a wireless communications system and an access network, in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including device(s) configured to perform the resource reevaluation aspects described herein. Some wireless communication may be exchanged directly between wireless devices based on sidelink. The communication may be based on vehicle-to-anything (V2X) or other device-to-device (D2D) communication, such as Proximity Services (ProSe), etc. Sidelink communication may be exchanged based on a PC5 interface, for example.

For sidelink communications with certain reliability requirements that experience a hidden node interference, a transmitter UE may not receive sidelink control information (SCI) of a transmitter located on a non-line-of-sight path (e.g., the hidden node), which may interfere with one or more intended receivers of a data transmission. For example, the transmitter UE may select resources that overlap with reserved resources of the transmitter, however, the transmitter UE may not become aware of the reserved resources The transmitter UE may not be able to decode the SCI of the transmitter due to signal strength issues (e.g., SINR) or traffic configuration (e.g., half duplex). Sensing performance for sidelink communication may be improved by configuring a receiver UE to forward the SCI of a first transmitter UE to a second transmitter UE. In this regard, the second transmitter UE (denoted as a sensing UE) can discover which resources may have already been reserved by the first transmitter UE (denoted as a forwarded UE) and determine whether the reserved resources are to be avoided for use in a transmission based on the receiver status of the receiver UE (denoted as a forwarding UE). In various aspects, transmitter UEs may transmit on partial bandwidth, which can allow the first transmitter UE and the second transmitter to transmit at the same time (e.g., during a same slot) using non overlapping resource block (RB) resources. However, an IBE collision may occur when the first transmitter UE (located near the receiver UE) transmits at the same time as a transmission intended for the receiver UE from the second transmitter UE (located farther from the receiver UE), although both transmissions are carried on non-overlapping RB frequency resources. In this case, IBE from the first transmitter is still strong enough to interfere with the signal from the second transmitter.

The present disclosure provides for techniques in facilitating sidelink control information forwarding for sensing procedure in sidelink communication. The sensing UE (the second transmitter UE) can protect its own transmission by ensuring that the receiver UE is it's intended receiver to avoid any false alarms and potential waste of resources. The sensing UE also can protect the transmission of the forwarded UE (the first transmitter UE) by ensuring whether the receiver UE is its intended receiver or it instead intends to receive from the forwarded UE. The sensing UE can protect its own transmission and the transmission of the forwarded UE by avoiding an overlap of time and/or frequency resources between the transmissions. In some aspects, the sensing may be based on a signal-to-interference ratio (SIR) measurement, where S is the measured reference signal received power (RSRP) from the receiver UE to the second transmitter UE, I is the measured RSRP from the first transmitter UE to the receiver UE, and SIR is the ratio of S to I. The SIR measurement can indicate how strong the interference would be if the second transmitter UE transmits on the forwarded resources (e.g., the reserved resources of the forwarded UE). In this regard, the second transmitter UE may avoid selecting overlapping resources when the SIR measurement is below a certain threshold. The present disclosure provides additional thresholds to help protect the transmissions of both the sensing UE and the forwarded UE. For example, the second transmitter UE may avoid overlapping in time with the first transmitter to minimize any IBE impact from the first transmitter by selecting non-overlapping time resources to transmit to the receiver UE (as the intended receiver of the second transmitter UE) when the SIR measurement is below a first threshold and/or a third threshold (when IBE from the first transmitter UE is higher). In another example, the second transmitter UE may avoid overlapping in time with the first transmitter to prevent any IBE impact onto the first transmitter by selecting non-overlapping time resources to transmit to the receiver UE (as the intended receiver of the first transmitter UE) when the SIR measurement is above a second threshold and/or a fourth threshold (when IBE from the second transmitter UE is higher).

In some examples, a UE 104 may be configured to manage one or more aspects of wireless communication by facilitating sidelink control information forwarding for sensing procedure in sidelink communication. As an example, in FIG. 1, the UE 104, the RSU 107, and/or other devices communicating as a receiver UE based on sidelink may include a forwarding component 198 configured to receive, from a second UE over a sidelink channel, control information. The forwarding component 198 can transmit, to a third UE over a sidelink channel, a forward message comprising the control information and information associated with the first UE. In another example, in FIG. 1, the UE 104, the RSU 107, and/or other devices communicating as a transmitter UE based on sidelink may include a sensing component 199 configured to receiving, from a second UE over a sidelink channel, a forward message comprising control information associated with a third UE, in which the control information includes a first measurement of the control information. The sensing component 199 can obtain a second measurement of the forward message. The sensing component 199 can determine a ratio of the second measurement to the first measurement. The sensing component 199 can select a specific resource based on the ratio and whether the second UE is an intended receiver for the first UE or the second UE intends to receive from the third UE. Further related aspects and features are described in more detail in connection with FIGS. 4-7D. Although the following description may be focused on 5G NR, the concepts described herein may be applicable to other similar areas, such as LTE, LTE-A, CDMA, GSM, and other wireless technologies.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

The wireless communications system and access network 100 in FIG. 1 (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., 51 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The described features generally relate to SCI forwarding for sensing procedure in D2D communications. As such, the concepts described herein, though sometimes described specifically for V2X communications, can be applied to substantially any D2D communication technologies. For example, D2D communication technologies can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), vehicle-to-pedestrian (V2P) communications, pedestrian-to-vehicle (P2V) communications, a combination thereof and/or with other devices, which can be collectively referred to as vehicle-to-anything (V2X) communications. In V2X communications, vehicle-based communication devices can communicate with one another and/or with infrastructure devices over a sidelink channel. Continued support and implementation of V2X communications is provided in 5G NR communication technologies, as well as LTE and other wireless communication technologies. Though aspects are generally described herein in terms of D2D/V2X communications, the concepts and techniques can be similarly applied more generally to substantially any type of wireless communications.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
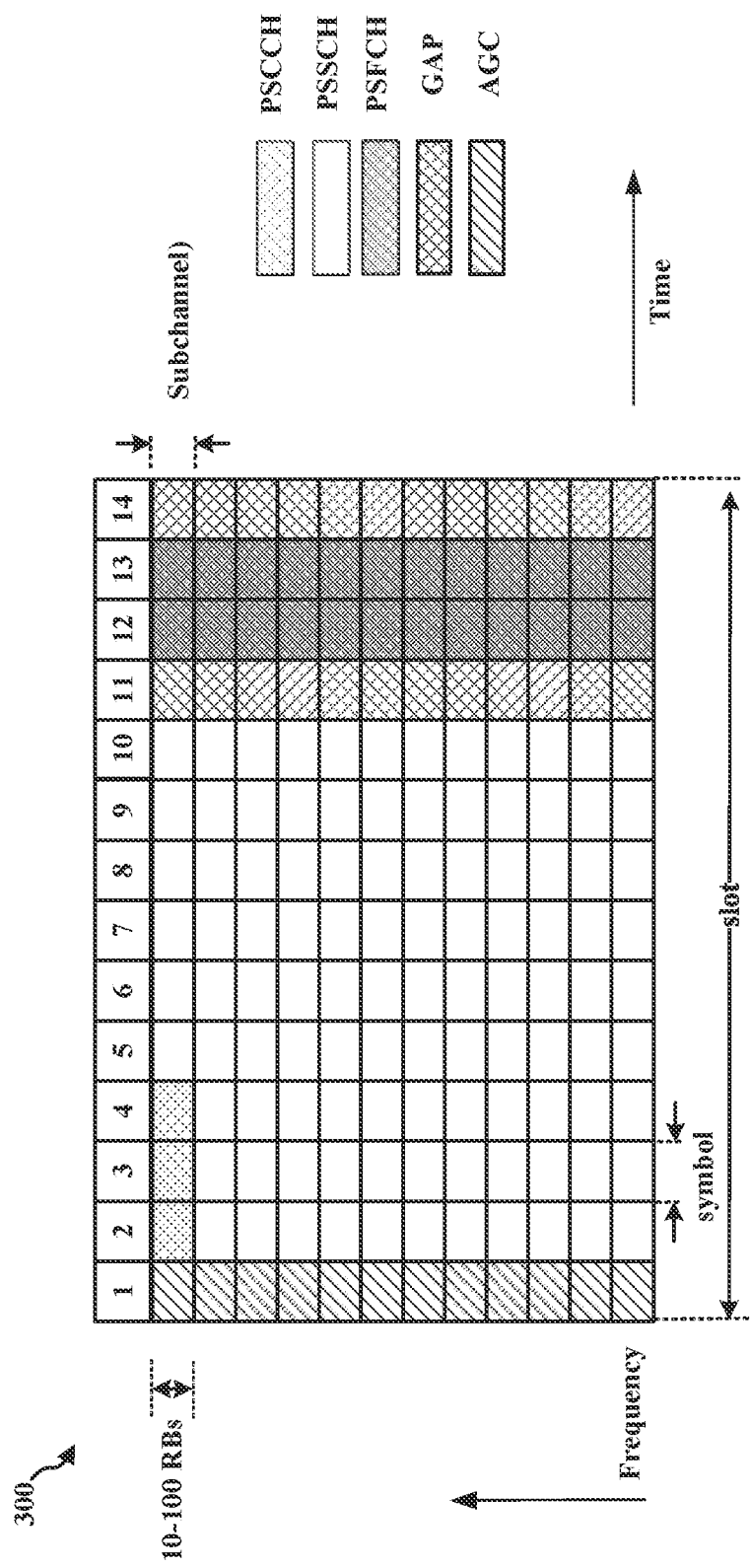
FIG. 3 illustrates example aspects of a sidelink slot structure.

FIG. 3 illustrates example diagram 300 illustrating non-limiting examples of time and frequency resources that may be used for wireless communication based on sidelink. In some examples, the time and frequency resources may be based on a slot structure. In other examples, a different structure may be used. The slot structure may be within a 5G/NR frame structure in some examples. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI).

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Diagram 300 also illustrates multiple subchannels, where each subchannel may include multiple RBs. For example, one subchannel in sidelink communication may include 10-100 RBs. As illustrated in FIG. 3, the first symbol of a subframe may be a symbol for automatic gain control (AGC). Some of the REs may include control information, e.g., along with PSCCH and/or PSSCH. The control information may include Sidelink Control Information (SCI). For example, the PSCCH can include a first-stage SCI. A PSCCH resource may start at a first symbol of a slot, and may occupy 1, 2 or 3 symbols. The PSCCH may occupy up to one subchannel with the lowest subcarrier index. FIG. 3 also illustrates symbol(s) that may include PSSCH. The symbols in FIG. 3 that are indicated for PSCCH or PSSCH indicate that the symbols include PSCCH or PSSCH REs. Such symbols corresponding to PSSCH may also include REs that include a second-stage SCI and/or data. At least one symbol may be used for feedback (e.g., PSFCH), as described herein. As illustrated in FIG. 3, symbols 12 and 13 are indicated for PSFCH, which indicates that these symbols include PSFCH REs. In some aspects, symbol 12 of the PSFCH may be a duplication of symbol 13. A gap symbol prior to and/or after the feedback may be used for turnaround between reception of data and transmission of the feedback. As illustrated in FIG. 3, symbol 10 includes a gap symbol to enable turnaround for feedback in symbol 11. Another symbol, e.g., at the end of the slot (symbol 14) may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the PSCCH, PSSCH, PSFCH, and gap symbols may be different than the example illustrated in FIG. 3.

Figure 4:
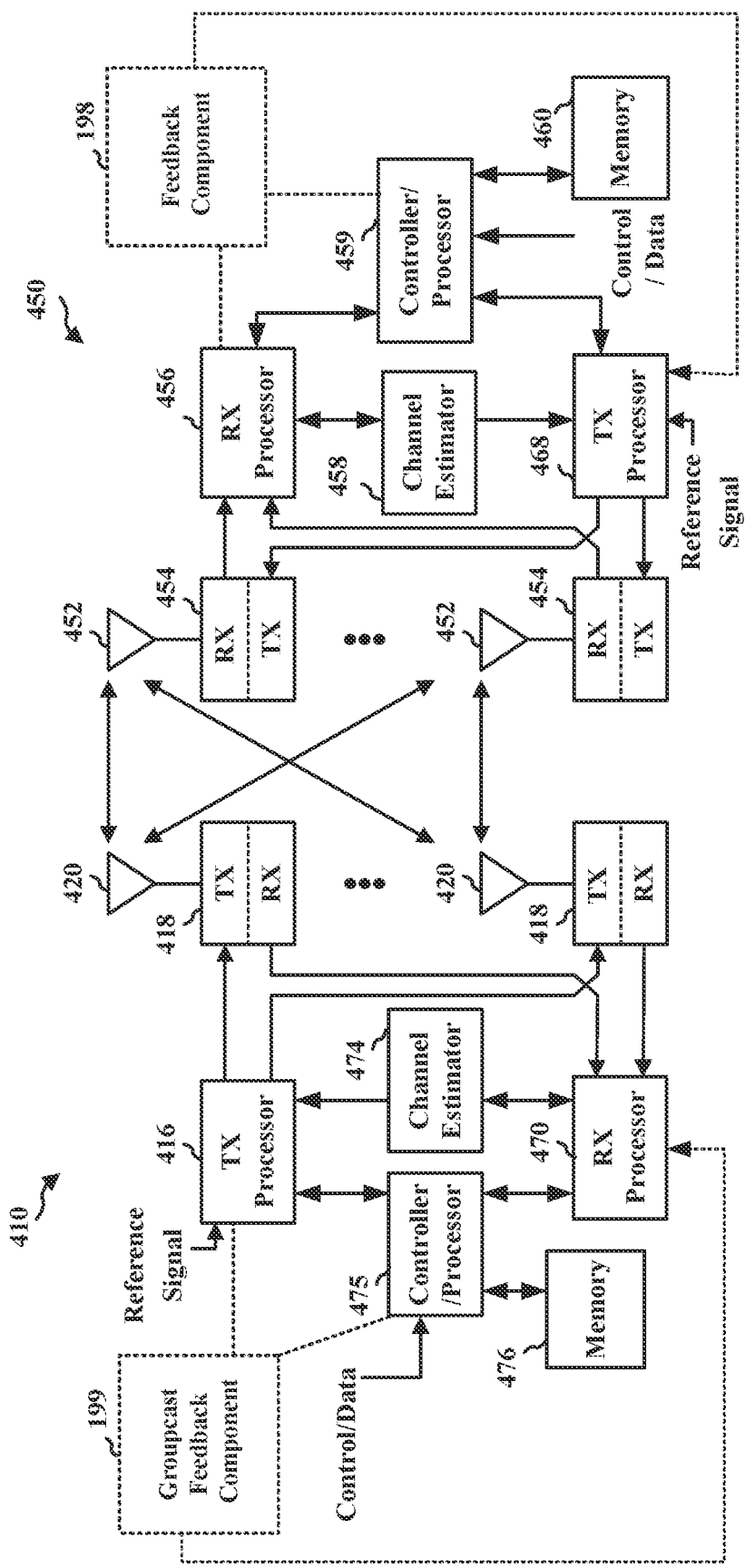
FIG. 4 is a diagram illustrating an example of a first device and a second device involved in wireless communication based, e.g., on V2X and/or other D2D communication, in accordance with aspects presented herein.

FIG. 4 is a block diagram 400 of a first wireless communication device 410 in communication with a second wireless communication device 450, e.g., via V2V, V2X or other D2D communication. The communication may be based, e.g., on sidelink using a PC5 interface. The transmitting device 410 and the 450 may comprise a UE, an RSU, etc. Packets may be provided to a controller/processor 475 that implements layer 4 and layer 2 functionality. Layer 4 includes a radio resource control (RRC) layer, and layer 2 includes a packet data convergence protocol (PDCP) layer, a radio link control (RLC) layer, and a medium access control (MAC) layer.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418TX. Each transmitter 418TX may modulate an RF carrier with a respective spatial stream for transmission.

At the device 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the device 450. If multiple spatial streams are destined for the device 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 410. These soft decisions may be based on channel estimates computed by the channel estimator 458. The soft decisions are then decoded and deinterleaved to recover the data and control signals that were originally transmitted by device 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. The controller/processor 459 may provide demultiplexing between transport and logical channels, packet reassembly, deciphering, header decompression, and control signal processing. The controller/processor 459 is also responsible for error detection using an acknowledgment (ACK) and/or negative acknowledgment (NACK) protocol to support Hybrid Automatic Repeat Request (HARD) operations.

Similar to the functionality described in connection with the transmission by device 410, the controller/processor 459 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The transmission is processed at the device 410 in a manner similar to that described in connection with the receiver function at the device 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. The controller/processor 475 provides demultiplexing between transport and logical channels, packet reassembly, deciphering, header decompression, control signal processing. The controller/processor 475 is also responsible for error detection using an ACK and/or NACK protocol to support HARQ operations.

At least one of the TX processor 468, the RX processor 456, or the controller/processor 459 of device 450 may be configured to perform aspects described in connection with the forwarding component 198 of FIG. 1.

At least one of the TX processor 416, the RX processor 470, or the controller/processor 475 of device 410 may be configured to perform aspects described in connection with the sensing component 199 of FIG. 1.

Figure 5:
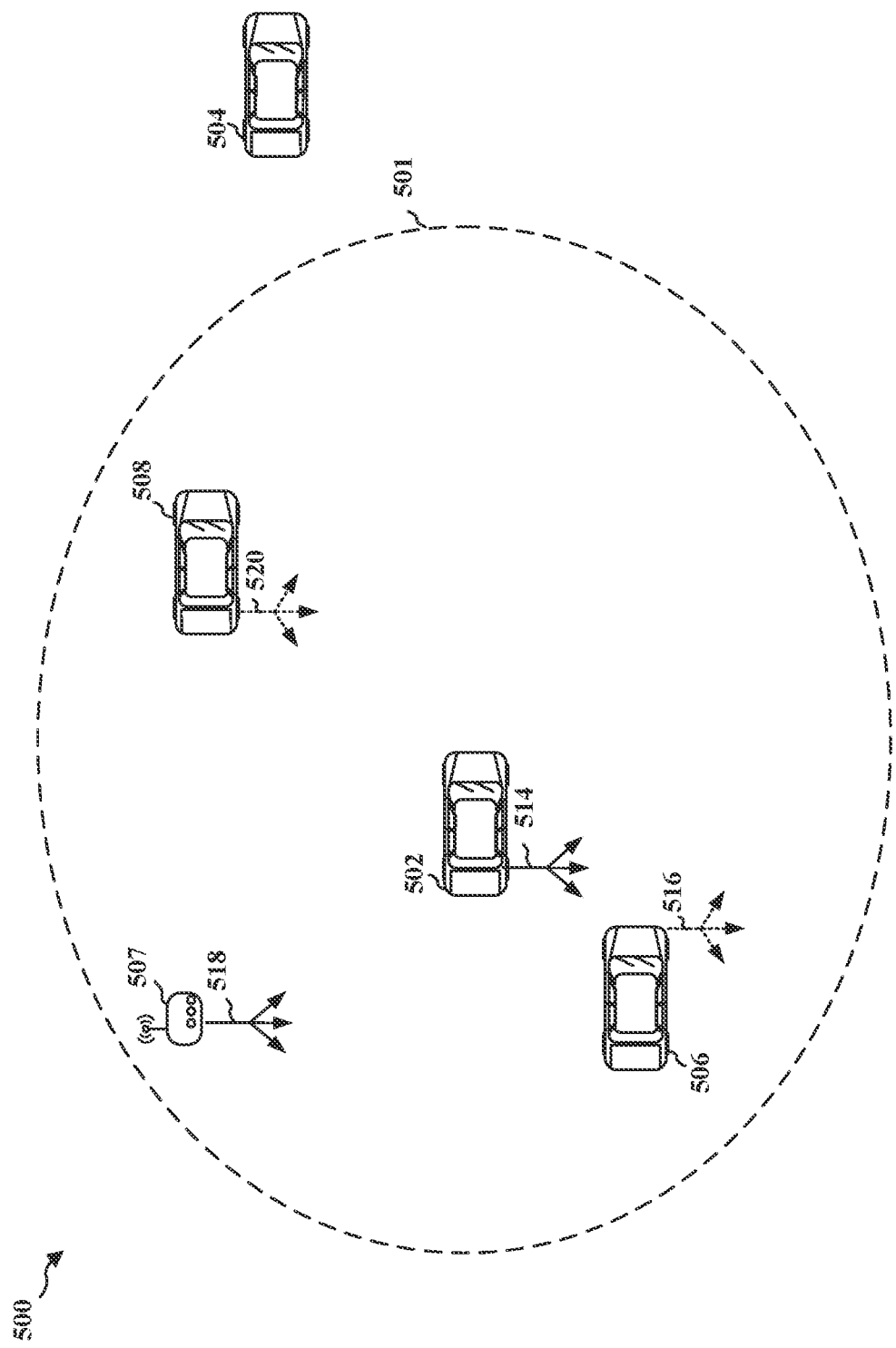
FIG. 5 illustrates example aspects of V2X and/or D2D communication between devices, in accordance with aspects presented herein.

FIG. 5 illustrates an example 500 of wireless communication between devices based on V2X or other D2D communication. The communication may be based on a slot structure. As an example, the slot structure may comprise aspects described in connection with FIG. 2. In some aspects, the UE 502 may communicate with the UEs 506, 508 and RSU 507 via a sidelink transmission. In some examples, the UE 502 may serve as a transmitter UE in a sidelink transmission and the UEs 506, 508 and RSU 507 may serve as receiver UEs in the sidelink transmission. For example, UE 502 may transmit a transmission 514, e.g., comprising a control channel and/or a corresponding data channel, that may be received by UEs 504, 506, 508. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 502, 504, 506, 508 may each be capable of operating as a transmitting device in addition to operating as a receiving device. Thus, UEs 506, 508 are illustrated as transmitting a transmissions 516, 520. The transmissions 514, 516, 520 may be broadcast or multicast to nearby devices. For example, UE 502 may transmit communication intended for receipt by other UEs within a range 501 of UE 502. Additionally/alternatively, RSU 507 may receive communication from and/or transmit communication to UEs 502, 504, 506, 508. One or more of the UEs 502, 504, 506, 508 or the RSU 507 that operate as receiver UEs may include a forwarding component 198 as described in connection with FIG. 1. In other aspects, one or more of the UEs 502, 504, 506, 508 or the RSU 507 that operate as transmitter UEs may include a sensing component 199 as described in connection with FIG. 1.

Devices communicating based on V2X, or other D2D based communication, may determine a radio resource in the time and frequency domain that are used by other devices in order to select transmission resources that avoid collisions with other devices. As an example in a first mode (e.g., Mode 1), resources may be assigned by a serving cell (or base station) for sidelink transmissions. In a second mode (e.g., Mode 2), individual devices may autonomously select resources for sidelink transmission, e.g., without a central entity such as a base station indicating the resources for the device. A first device may reserve the selected resources in order to inform other devices about the resources that the first device intends to use.

As described above in connection with sensing procedures in sidelink communication, a transmitter UE that experiences a potential hidden node interference may not receive sidelink control information (SCI) of a transmitter located on a non-line-of-sight path (e.g., the hidden node), which may interfere with one or more intended receivers of a data transmission. For example, the transmitter UE may select resources that overlap with reserved resources of the transmitter, however, the transmitter UE may not become aware of the reserved resources The transmitter UE may not be able to decode the SCI of the transmitter due to signal strength issues (e.g., SINR) or traffic configuration (e.g., half duplex).

A receiver UE, such as the UE 502, may forward the SCI of a first transmitter UE, such as the UE 506, to a second transmitter UE, such as the UE 508. In this regard, the second transmitter UE (denoted as a sensing UE) can discover which resources may have already been reserved by the first transmitter UE (denoted as a forwarded UE) and determine whether the reserved resources are to be avoided for use in a transmission based on the receiver status of the receiver UE (denoted as a forwarding UE). In various aspects, transmitter UEs may transmit on partial bandwidth, which can allow the first transmitter UE and the second transmitter to transmit at the same time (e.g., during a same slot) using non overlapping resource block (RB) resources. However, an IBE collision may occur when the first transmitter UE (located near the receiver UE) transmits at the same time as a transmission intended for the receiver UE from the second transmitter UE (located farther from the receiver UE), although both transmissions are carried on non-overlapping RB frequency resources. In this case, IBE from the first transmitter is still strong enough to interfere with the signal from the second transmitter. In this regard, the sensing performance for sidelink communication may be improved by configuring a receiver UE to forward the SCI of a first transmitter UE to a second transmitter UE that helps to improve the reliability of sidelink transmissions with potential hidden node interferences.

Figure 6:
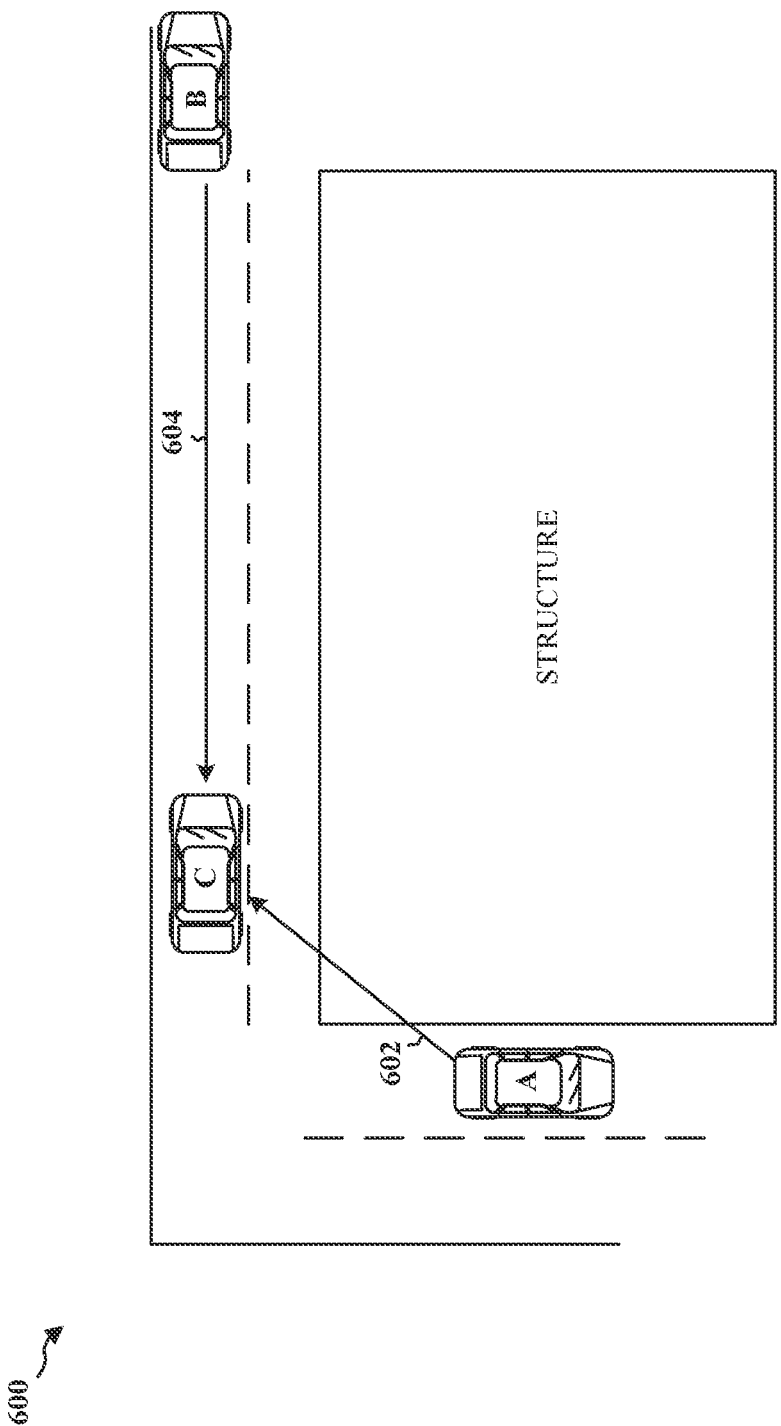
FIG. 6 illustrates a diagram showing a hidden node example.

FIG. 6 illustrates a diagram showing a hidden node example 600. In FIG. 6, device A is traveling on a first road and devices B and C are traveling on a second road. Device B may be outside of a protected radius, e.g., an intended range, of device A. Therefore, the same time and frequency resources may be used for transmissions by device A and device B. Device C may be an intended receiver for transmissions 602 from device A. However, the signal from device A to device C may be weak, because the channel is a non-line of sight (NLOS) channel. In contrast, the IBE interference that device C experiences due to transmission 604 from device B may be substantial, because there is a line of sight (LOS) condition for devices B and C. In various aspects, each of device A and device B may transmit on partial bandwidth, which can allow device A and device B to transmit at the same time (e.g., during a same slot) using non overlapping resource block (RB) resources. However, an IBE collision may occur when device B (located near device C and/or has LOS to device C) transmits at the same time as a transmission intended for device C from device A (located farther from device C and/or has NLOS to device C), although both transmissions are carried on non-overlapping RB frequency resources. In this case, IBE from device A is still strong enough to interfere with the signal from device B.

As described above for sidelink communications with certain reliability requirements that experience a hidden node interference, a transmitter UE (e.g., device A) may not receive the SCI of an interfering device (e.g., device B) located on a non-line-of-sight path (e.g., the hidden node), which may interfere with one or more intended receivers of a data transmission (e.g., device C). For example, device A may select resources that overlap with reserved resources of device B, however, device A may not become aware of the reserved resources. Device A may not be able to decode the SCI of device B due to signal strength issues (e.g., signal-to-interference-plus-noise ratio) or traffic configuration (e.g., half duplex).

The present disclosure provides a mechanism to improve the sensing performance for sidelink communication by configuring a receiver UE, such as device C, to forward the SCI of a first transmitter UE, such as device B, to a second transmitter UE, such as device A. In this regard, the second transmitter UE (denoted as a sensing UE) can discover which resources may have already been reserved by the first transmitter UE (denoted as a forwarded UE) and determine whether the reserved resources are to be avoided for use in a transmission based on the receiver status of the receiver UE (denoted as a forwarding UE). In this regard, the sensing UE (the second transmitter UE) can protect its own transmission by ensuring that the receiver UE is it's intended receiver to avoid any false alarms and potential waste of resources. The sensing UE also can protect the transmission of the forwarded UE (the first transmitter UE) by ensuring whether the receiver UE is its intended receiver or it instead intends to receive from the forwarded UE. The sensing UE can protect its own transmission and the transmission of the forwarded UE by avoiding an overlap of time and frequency resources between the transmissions. The sensing may be based on a SIR measurement, where S is the measured RSRP from the receiver UE to the second transmitter UE, and I is the measured RSRP from the first transmitter UE to the receiver UE. The SIR measurement can indicate how strong the interference would be if the second transmitter UE transmits on the forwarded resources (e.g., the reserved resources of the forwarded UE). In this regard, the second transmitter UE may avoid selecting overlapping resources when the SIR measurement is below a certain threshold. The present disclosure provides additional thresholds to help protect the transmissions of both the sensing UE and the forwarded UE. For example, the second transmitter UE may avoid overlapping in time with the first transmitter to minimize any IBE impact from the first transmitter by selecting non-overlapping time resources to transmit to the receiver UE (as the intended receiver of the second transmitter UE) when the SIR measurement is below a first threshold and/or a third threshold (when IBE from the first transmitter UE is higher). In another example, the second transmitter UE may avoid overlapping in time with the first transmitter to prevent any IBE impact onto the first transmitter by selecting non-overlapping time resources to transmit to the receiver UE (as the intended receiver of the first transmitter UE) when the SIR measurement is above a second threshold and/or a fourth threshold (when IBE from the first transmitter UE is higher).

FIGS. 7A-7D illustrate examples of sidelink control information forwarding for sensing procedure in sidelink communication, in accordance with aspects presented herein. Each of FIGS. 7A-7D illustrates a first sidelink communication channel between device A and device C, and a second sidelink communication channel between device B and device C. As described above, the sensing performance for sidelink communication can be improved by configuring a receiver UE, such as device C, to forward the SCI of a first transmitter UE, such as device B, to a second transmitter UE, such as device A. In this regard, the second transmitter UE (denoted as a sensing UE) can discover which resources may have already been reserved by the first transmitter UE (denoted as a forwarded UE) and determine whether the reserved resources are to be avoided for use in a transmission based on the receiver status of the receiver UE (denoted as a forwarding UE).

In example 700 of FIG. 7A, device C, at time 1, receives, from device A over a sidelink channel, control information. At time 2, device C transmits, to device B over a sidelink channel, a forward message that includes the control information associated with device A and information associated with device C. The information associated with device C may include an indication of whether device C intends to receive from device A. In some aspects, the information associated with device C may include an estimated signal-to-interference ratio level when the indication indicates that device C intends to receive from device A. In some aspects, the information associated with device C may include a receiver identifier of device C and location information of device C. The location information of device C may include TX-RX distance information relative to device B and/or device A. At time 2, device C may obtain one or more measurements of the control information associated with device A and transmit along with the control information. Device C may modify the control information associated with device A by inserting the information associated with device C into at least a portion of the control information. For example, device C may insert the one or more measurements into at least a portion of the control information. The one or more measurements may include one or more of a received signal strength indicator (RSSI) measurement, a RSRP measurement, a reference signal received quality (RSRQ) measurement, a signal-to-noise ratio (SNR), or a signal-to-interference-plus-noise ratio (SINR).

At time 2, device B may receive, from device C, over a sidelink channel, a forward message comprising control information associated with device A, in which the control information includes a first measurement of the control information. For example, the first measurement may represent interference from device A to device C (denoted as "I"). In this regard, device C may have obtained an RSRP measurement of the control information and transmitted along with the control information. In some aspects, device B may obtain a second measurement of the forward message. For example, the second measurement may represent the signal strength from device B to device C (denoted as "S"). In this regard, device B may obtain an RSRP measurement of the received forward message including the control information contained therein. In this regard, device B determines the SIR based on the first measurement ("I") and the second measurement ("S"), where the SIR is the ratio of S to I.

As described above, the sensing performance can be improved by comparing the SIR measurements against one or more thresholds depending on the receiver status of the forwarding UE (e.g., device C). In some examples, there may be four different thresholds (e.g., T1-T4), where T3<T1<T2<T4. In some aspects, device B may determine a ratio of the second measurement to the first measurement. For example, device B may determine a SIR measurement.

In some aspects, device B may select a specific resource based on the SIR measurement and whether device C is an intended receiver for device B or device C intends to receive from device A. In some aspects, device B may determine whether device C is the intended receiver for device B based on the receiver identifier of device C and the location information of device C. In some aspects, the receiver identifier of device C may be associated with one or more identifiers of device B such that device B determines that device C is a likely intended receiver. In other aspects, the location information may indicate that the TX-RX distance between device C and device B is within range for device B to conclude that device C is an intended receiver. In this regard, based on the location information and receiver identifier of device C, device B may determine that device C is indeed an intended receiver.

In some aspects, device B may determine whether the SIR measurement does not exceed the third threshold (e.g., T3) when device C is the intended receiver for device B. In some aspects, the control information may indicate reservation of resources associated with device A. Device B may determine that the SIR measurement does not exceed the third threshold (or SIR is below T3). In this regard, device B may select the specific resource from one or more resources that do not overlap in time with the resources of the reservation when the SIR is below T3 in order to avoid a potential IBE collision with device A.

In other aspects, device B may determine that the SIR measurement exceeds T3. In this regard, device B may determine whether the SIR does not exceed the first threshold (e.g., T1). In this regard, device B may select the specific resource from one or more resources that do not overlap with the resources of the reservation when the SIR is below T1.

In some aspects, device B may determine that the SIR exceeds the first threshold (or is above T1). In this regard, device B may determine whether device C intends to receive from device A based on an indication in the control information when the ratio exceeds the first threshold. In some aspects, the indication may include a binary bit field, where a logical value "1" indicates that device C intends to receive from device A and a logical value "0" indicates that device C does not intend to receive from device A. In some aspects, device C may be configured to modify the control information and insert the bit value based on its sidelink resource allocation with respect to device A. As illustrated in FIG. 7A, device B determines that device C does not intend to receive from device A based on the indication (e.g., indicating a bit value "0"). In this regard, device B may select the specific resource by selecting a resource including one or more resources that may overlap with at least a portion of the resources from the reservation since device B has determined that the transmission to device C may not experience any significant interference, thus increasing the reliability of sidelink communication between devices B and C as well as between devices A and C.

At time 3, device B may communicate, with device C on the specific resource over a sidelink channel, a data transmission. Conversely, device C may receive, from device C on a specific resource over the sidelink channel, the data transmission. In some aspects, the specific resource may be based on the control information and information associated with device A. For illustrative purposes only, the SIR of the data transmissions for the sidelink channel between device A and device C (denoted as "I_data=I") and sidelink channel between device B and device C (denoted as "S_data=S") can be expressed as the ratio of S_data to I_data.

For purposes of brevity in explanation, only the differences illustrated in FIGS. 7B to 7D with respect to FIG. 7A will be discussed.

In example 720 of FIG. 7B, device C, at time 1, receives, from device A over a sidelink channel, control information. At time 2, device C transmits, to device B over a sidelink channel, a forward message that includes the control information associated with device A and information associated with device C. At time 2, device B may determine whether device C is the intended receiver for device B based on the receiver identifier of device C and the location information of device C. Based on the location information and receiver identifier of device C, device B may determine that device C is not an intended receiver for device B. In this regard, device B may determine whether device C intends to receive from device A based on an indication in the control information (e.g., bit value). Device B may determine that the indication indicates a logical "1" value to denote that device C does intend to receive from device A. In this regard, device B may determine whether the SIR exceeds a fourth threshold (or is above T4) when device C intends to receive from device A. Device B may select the specific resource by selecting one or more resources that do not overlap in time with the resources of the reservation when the ratio exceeds the fourth threshold. Otherwise, device B may determine whether the SIR exceeds the second threshold (or is above T2), when the SIR does not exceed T4. In some aspects, device B may select the specific resource by selecting one or more resources that do not overlap with the resources from the reservation when the ratio exceeds the second threshold. In other aspects, device B may select the specific resource by selecting a resource including one or more resources that overlap with at least a portion of the resources from the reservation when the ratio does not exceed the second threshold. At time 3, device B may communicate, with device C on the specific resource over a sidelink channel, a data transmission. For illustrative purposes only, the SIR of the data transmissions for the sidelink channel between device A and device C (denoted as "S_data=I") and sidelink channel between device B and device C (denoted as "I_data=S") can be expressed as the ratio of I_data to S_data.

In example 740 of FIG. 7C, device C, at time 1, receives, from device A over a sidelink channel, control information. At time 2, device C transmits, to device B over a sidelink channel, a forward message that includes the control information associated with device A and information associated with device C. At time 2, device B may determine whether device C is the intended receiver for device B based on the receiver identifier of device C and the location information of device C. In this regard, based on the location information and receiver identifier of device C, device B may determine that device C is indeed an intended receiver.

In some aspects, device B may determine whether the SIR measurement does not exceed the third threshold (e.g., T3) when device C is the intended receiver for device B. In some aspects, the control information may indicate reservation of resources associated with device A. Device B may determine that the SIR measurement does not exceed the third threshold (or SIR is below T3). In this regard, device B may select the specific resource from one or more resources that do not overlap in time with the resources of the reservation when the SIR is below T3 in order to avoid a potential IBE collision with device A.

In other aspects, device B may determine that the SIR measurement exceeds T3. In this regard, device B may determine whether the SIR does not exceed the first threshold (e.g., T1). In this regard, device B may select the specific resource from one or more resources that do not overlap with the resources of the reservation when the SIR is below T1.

In some aspects, device B may determine that the SIR exceeds the first threshold (or is above T1). In this regard, device B may determine whether device C intends to receive from device A based on an indication in the control information when the ratio exceeds the first threshold. Device B may determine that the indication indicates a logical "1" value to denote that device C does intend to receive from device A. In this regard, device B may determine whether the SIR exceeds the fourth threshold (or is above T4) when device C intends to receive from device A. Device B may select the specific resource by selecting one or more resources that do not overlap in time with the resources of the reservation when the ratio exceeds the fourth threshold. Otherwise, device B may determine whether the SIR exceeds the second threshold (or is above T2), when the SIR does not exceed T4. In some aspects, device B may select the specific resource by selecting one or more resources that do not overlap with the resources from the reservation when the ratio exceeds the second threshold. In other aspects, device B may select the specific resource by selecting a resource including one or more resources that overlap with at least a portion of the resources from the reservation when the ratio does not exceed the second threshold. At time 3, device B may communicate, with device C on the specific resource over a sidelink channel, a data transmission. For illustrative purposes only, the SIR of the data transmissions for the sidelink channel between device A and device C (denoted as "S_data=I") and sidelink channel between device B and device C (denoted as "I_data=S") can be expressed as the ratio of I_data to S_data.

In example 760 of FIG. 7D, device C, at time 1, receives, from device A over a sidelink channel, control information. At time 2, device C transmits, to device B over a sidelink channel, a forward message that includes the control information associated with device A and information associated with device C. At time 2, device B may determine whether device C is the intended receiver for device B based on the receiver identifier of device C and the location information of device C. Based on the location information and receiver identifier of device C, device B may determine that device C is not an intended receiver for device B. As illustrated in FIG. 7D, a different device, such as device D, is instead the intended receiver for device B. In this regard, device B may determine whether device C intends to receive from device A based on an indication in the control information (e.g., bit value) when device C is not the intended receiver for device B. As illustrated in FIG. 7D, device B determines that device C does not intend to receive from device A based on the indication (e.g., indicating a bit value "0"). As illustrated in FIG. 7D, device C does not intend to receive from device A because a different device, such as device E, is instead the intended receiver for device A. In some aspects, device B may select the specific resource by selecting a resource including one or more resources that may overlap with at least a portion of the resources from the reservation since device B has determined that the transmission to device C may not experience a potential collision or actual collision due to IBE, thus increasing the reliability of sidelink communication between devices B and C as well as between devices A and C.

Figure 8:
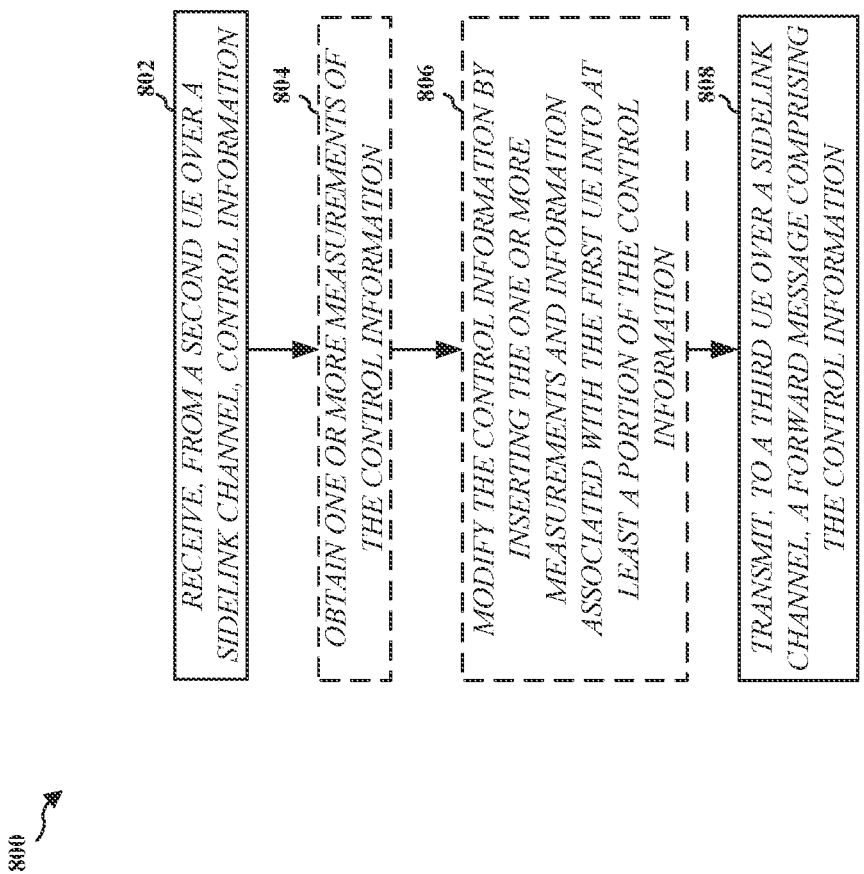
FIG. 8 is an example flowchart of a process of wireless communication at a forwarding UE including sidelink control information forwarding for sensing procedure, in accordance with aspects presented herein.

FIG. 8 is an example flowchart of a process 800 of wireless communication at a forwarding UE including sidelink control information forwarding for sensing procedure, in accordance with aspects presented herein. The process 800 may be performed by a wireless communication device (e.g., the UE 104, 502, 504, 506, 508; the device 410 or 450, the RSU 107, 507, which may include memory, a cellular baseband processor, and one or more components configured to perform the process 800). As illustrated, the process 800 includes a number of enumerated steps, but embodiments of the process 800 may include additional steps before, after, and in between the enumerated steps. In some embodiments, one or more of the enumerated steps may be omitted or performed in a different order. Optional aspects are illustrated with a dashed line.

The process 800 enables a wireless communication device to forward the SCI of a first transmitter to a second transmitter that may be experiencing hidden node interference due to a NLOS path between the first transmitter and the second transmitter. Thus, the mechanism may increase reliability of sidelink resource sensing by facilitating the SCI forwarding. The process 800 enables the wireless communication device to perform SCI forwarding in sidelink sensing procedures.

At 802, a first wireless communication device, such as a forwarding UE, may receive, from a second wireless communication device over a sidelink channel, control information. The first wireless communication device may receive the control information, e.g., as described in connection with FIGS. 1-7D. The control information may be received, e.g., by the sidelink control information component 1140 via the reception component 1130 of the apparatus 1102 in FIG. 11.

At 804, the first wireless communication device may obtain one or more measurements of the control information, e.g., as described in connection with FIGS. 1-7D. In some aspects, the one or more measurements can include one or more of a RSSI measurement, a RSRP measurement, a RSRQ measurement, a SNR, or a SINR. The one or more measurements may be obtained, e.g., by the measurement component 1144 of the apparatus 1102 in FIG. 11.

At 806, the first wireless communication device may modify the control information by inserting information associated with the first wireless communication device into at least a portion of the control information. The control information may be modified, e.g., by the sidelink control information component 1140 of the apparatus 1102 in FIG. 11. In some aspects, the at least a portion of the control information may correspond to a bit field allocation for receiving the inserted information from the first wireless communication device. In some examples, the first wireless communication device may obtain the one or more measurements and transmit along with the control information. In some aspects, the information associated with the first wireless communication device may include an indication of whether the first wireless communication device intends to receive from the second wireless communication device. In some aspects, the information associated with the first wireless communication device may include an estimated signal-to-interference ratio level when the indication indicates that the first wireless communication device intends to receive from the second wireless communication device. In some aspects, the information associated with the first wireless communication device may include a receiver identifier of the first wireless communication device. In some aspects, the information associated with the first wireless communication device may include location information of the first wireless communication device.

At 808, the first wireless communication device may transmit, to a third wireless communication device over a sidelink channel, a forward message comprising the control information and information associated with the first wireless communication device. The first wireless communication device may transmit the forward message, e.g., as described in connection with FIGS. 1-7D. The forward message may be transmitted, e.g., by the sidelink forwarding component 1142 via the transmission component 1134 of the apparatus 1102 in FIG. 11.

A wireless apparatus may include components that perform each of the blocks of the algorithm in the aforementioned flowchart of FIG. 8. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus for wireless communication may include means for performing any of the blocks of the process described in connection with FIG. 8. The aforementioned means may be one or more of the aforementioned components of the apparatus and/or a processing system of the apparatus configured to perform the functions recited by the aforementioned means. The processing system may include the TX processor 416, 468, the RX processor 470, 456, and the controller/processor 475, 459. As such, in one configuration, the aforementioned means may be the TX processor 416, 468, the RX processor 470, 456, and the controller/processor 475, 459 configured to perform the functions recited by the aforementioned means.

Figure 9:
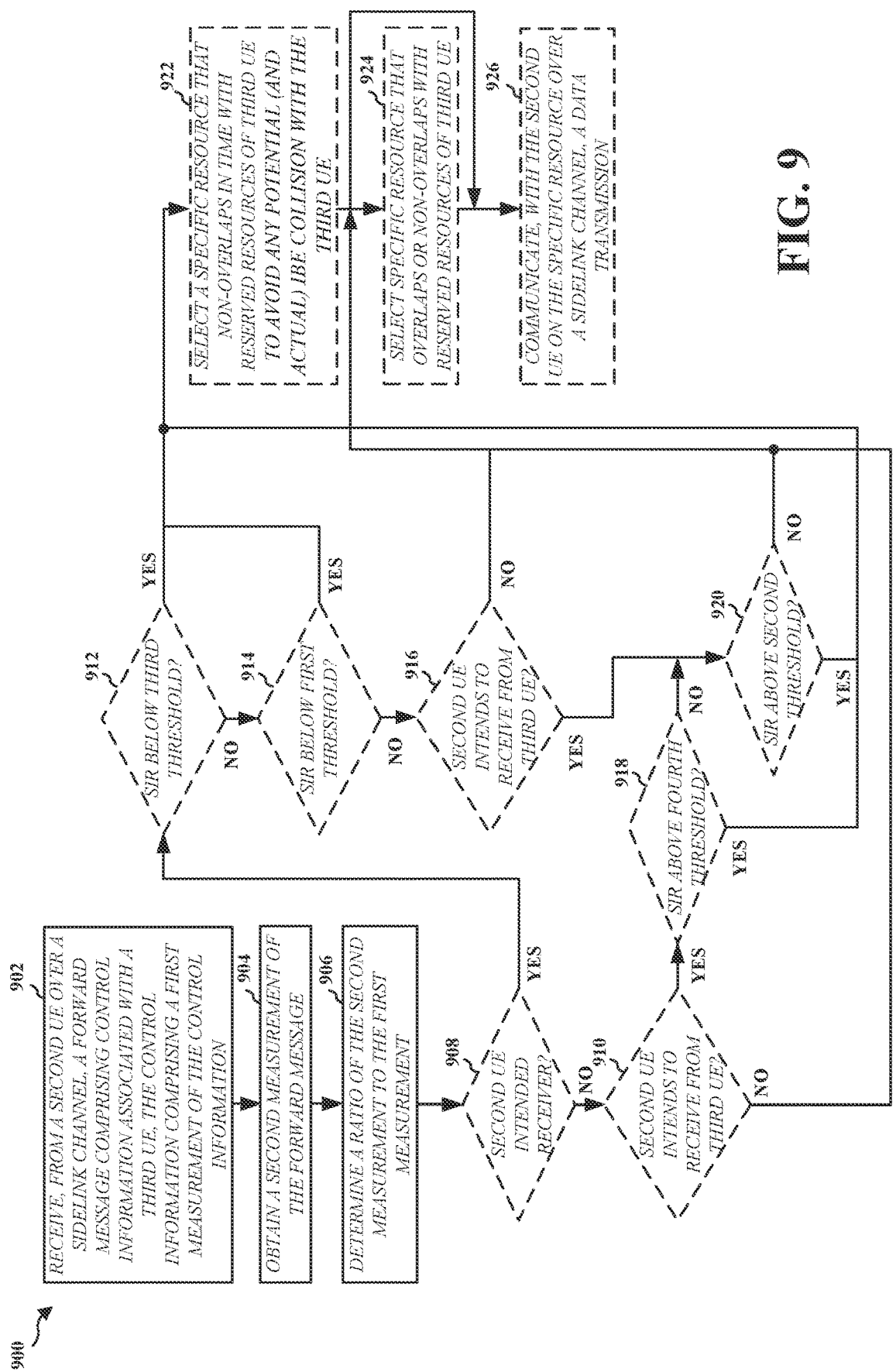
FIG. 9 is an example flowchart of a process of wireless communication at a sensing UE including sidelink control information forwarding for sensing procedure, in accordance with aspects presented herein.

FIG. 9 is an example flowchart of a process 900 of wireless communication at a forwarded UE including sidelink control information forwarding for sensing procedure, in accordance with aspects presented herein. The process 900 may be performed by a wireless communication device (e.g., the UE 104, 502, 504, 506, 508; the device 410 or 450, the RSU 107, 507, which may include memory, a cellular baseband processor, and one or more components configured to perform the process 900). As illustrated, the process 900 includes a number of enumerated steps, but embodiments of the process 900 may include additional steps before, after, and in between the enumerated steps. In some embodiments, one or more of the enumerated steps may be omitted or performed in a different order. Optional aspects are illustrated with a dashed line. The process 900 enables a wireless communication device to forward the SCI of a first transmitter to a second transmitter that may be experiencing hidden node interference due to a NLOS path between the first transmitter and the second transmitter. Thus, the mechanism may increase reliability of sidelink resource sensing by facilitating the SCI forwarding. The process 900 enables the wireless communication device to facilitate SCI forwarding in sidelink sensing procedures.

At 902, a first wireless communication device may receive, from a second wireless communication device over a sidelink channel, a forward message comprising control information associated with a third wireless communication device, the control information comprising a first measurement of the control information. The first wireless communication device may receive the forward message, e.g., as described in connection with FIGS. 1-7D. The forward message may be received, e.g., by the sidelink forwarding component 1140 via the reception component 1130 of the apparatus 1102 in FIG. 11.

At 904, the first wireless communication device may obtain a second measurement of the forward message. The first wireless communication device may obtain the second measurement, e.g., as described in connection with FIGS. 1-7D. The second measurement of the forward message may be obtained, e.g., by the measurement component 1144 of the apparatus 1102 in FIG. 11.

At 906, the first wireless communication device may determine a ratio of the second measurement to the first measurement. The first wireless communication device may determine the ratio, e.g., as described in connection with FIGS. 1-7D. The ratio of the second measurement to the first measurement may be determined, e.g., by the measurement ratio component 1146 of the apparatus 1102 in FIG. 11.

At 908, the first wireless communication device may determine whether the second wireless communication device is the intended receiver for the first wireless communication device based on the receiver identifier of the second wireless communication device and the location information of the second wireless communication device. The intended receiver for the first wireless communication device may be determined, e.g., by the determination component 1148 of the apparatus 1102 in FIG. 11. If the first wireless communication device determines that the second wireless communication device is the intended receiver, then the process 900 proceeds to block 912. Otherwise, if the second wireless communication device is not the intended receiver, then the process 900 proceeds to block 910.

At 912, the first wireless communication device may determine whether the ratio does not exceed a third threshold when the second wireless communication device is the intended receiver for the first wireless communication device. The comparison between the ratio and the third threshold may be determined, e.g., by the measurement ratio component 1146 and/or the determination component 1148 of the apparatus 1102 in FIG. 11. If the first wireless communication device determines that the ratio is below the third threshold, then the process 900 proceeds to block 922. Otherwise, if the ratio is not below the third threshold, then the process 900 proceeds to block 914.

At 914, the first wireless communication device may determine whether the ratio does not exceed a first threshold, when the ratio exceeds the third threshold. The comparison between the ratio and the first threshold may be determined, e.g., by the measurement ratio component 1146 and/or the determination component 1148 of the apparatus 1102 in FIG. 11. If the first wireless communication device determines that the ratio is below the first threshold, then the process 900 proceeds to block 922. Otherwise, if the ratio is not below the first threshold, then the process 900 proceeds to block 916.

At 916, the first wireless communication device may determine whether the second wireless communication device intends to receive from third wireless communication device based on an indication in the control information when the ratio exceeds the first threshold. The determination of whether the second wireless communication device intends to receive from the third wireless communication device may be performed, e.g., by the determination component 1148 of the apparatus 1102 in FIG. 11. If the first wireless communication device determines that the second wireless communication device does intend to receive from the third wireless communication device, then the process 900 proceeds to block 920. Otherwise, if the second wireless communication device does not intend to receive from the third wireless communication device, then the process 900 proceeds to block 924. In some aspects, the control information may include an estimated signal-to-interference ratio level when the indication indicates that the second wireless communication device intends to receive from the third wireless communication device. In some aspects, the first wireless communication device may obtain the first measurement of the control information from the estimated signal-to-interference ratio level. In some aspects, the first wireless communication device may determine the second threshold based on the estimated signal-to-interference ratio level. In some aspects, the first wireless communication device may determine the fourth threshold implicitly based on the second threshold. The first wireless communication device may determine the second threshold and the fourth threshold based on the estimated signal-to-interference ratio level.

At 920, the first wireless communication device may determine whether the ratio exceeds a second threshold, when second wireless communication device intends to receive from third wireless communication device. The comparison between the ratio and the second threshold may be determined, e.g., by the measurement ratio component 1146 and/or the determination component 1148 of the apparatus 1102 in FIG. 11. If the first wireless communication device determines that the ratio is above the second threshold, then the process 900 proceeds to block 922. Otherwise, if the ratio is not above the second threshold, then the process 900 proceeds to block 924.

Referring back to block 910, the first wireless communication device may determine whether second wireless communication device intends to receive from the third wireless communication device based on an indication in the control information when the second wireless communication device is not the intended receiver. The determination of whether the second wireless communication device intends to receive from the third wireless communication device may be performed, e.g., by the determination component 1148 of the apparatus 1102 in FIG. 11. If the first wireless communication device determines that the second wireless communication device does intend to receive from the third wireless communication device, then the process 900 proceeds to block 918. Otherwise, if the second wireless communication device does not intend to receive from the third wireless communication device, then the process 900 proceeds to block 924.

At 918, the first wireless communication device may determine whether the ratio exceeds a fourth threshold, when second wireless communication device intends to receive from third wireless communication device. If the first wireless communication device determines that the ratio is above the fourth threshold, then the process 900 proceeds to block 922. Otherwise, if the ratio is not above the fourth threshold, then the process 900 proceeds to block 920. The comparison between the ratio and the fourth threshold may be determined, e.g., by the measurement ratio component 1146 and/or the determination component 1148 of the apparatus 1102 in FIG. 11.

At 922, the first wireless communication device may select the specific resource by selecting one or more resources that do not overlap in time with the resources from the reservation to avoid any potential (and actual) IBE collision with the third wireless communication device. The specific resource may be selected, e.g., by the resource selection component 1150 of the apparatus 1102 in FIG. 11. The process 900 proceeds from block 922 to block 926. At 924, the first wireless communication device may select the specific resource by selecting a resource including one or more resources that may overlap with at least a portion of the resources from the reservation. The process 900 proceeds from block 924 to block 926. The first wireless communication device may select the specific resource, e.g., as described in connection with FIGS. 1-7D.

At 926, the first wireless communication device may communicate, with the second wireless communication device on the specific resource over a sidelink channel, a data transmission. The first wireless communication device may communicate the data transmission, e.g., as described in connection with FIGS. 1-7D. The data transmission may be transmitted, e.g., by the sidelink communication manager 1132 via the transmission component 1134 of the apparatus 1102 in FIG. 11. Conversely, the second wireless communication device may receive, from the second wireless communication device on a specific resource over the sidelink channel, a data transmission. The data transmission may be received, e.g., by the sidelink communication manager 1132 via the reception component 1130 of the apparatus 1102 in FIG. 11. In some aspects, the specific resource may be based on the control information and information associated with the third wireless communication device.

In some aspects, the first wireless communication device may receive, from a base station over a downlink channel, a configuration. The first wireless communication device may determine at least one of the first threshold, the second threshold, the third threshold or the fourth threshold from at least a portion of the configuration. In some aspects, at least one of the second threshold, the third threshold or the fourth threshold is based on a signal-to-noise ratio level to decode data signaling and associated modulation coding scheme information. In some aspects, at least one of the second threshold, the third threshold or the fourth threshold is based on a signal-to-noise ratio level to decode control signaling. In some aspects, the second threshold is a negated representation of the first threshold (e.g., T2=−T1). In some aspects, the third threshold is a delta dB below the first threshold (e.g., T3=T1−ΔdB). In some aspects, the fourth threshold is a negated representation of the second threshold (e.g., T4=−T2). In some aspects, the fourth threshold is a delta dB above the second threshold (e.g., T4=T2+ΔdB).

A wireless apparatus may include components that perform each of the blocks of the algorithm in the aforementioned flowchart of FIG. 9. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus for wireless communication may include means for performing any of the blocks of the process described in connection with FIG. 9. The aforementioned means may be one or more of the aforementioned components of the apparatus and/or a processing system of the apparatus configured to perform the functions recited by the aforementioned means. The processing system may include the TX processor 416, 468, the RX processor 470, 456, and the controller/processor 475, 459. As such, in one configuration, the aforementioned means may be the TX processor 416, 468, the RX processor 470, 456, and the controller/processor 475, 459 configured to perform the functions recited by the aforementioned means.

Figure 10:
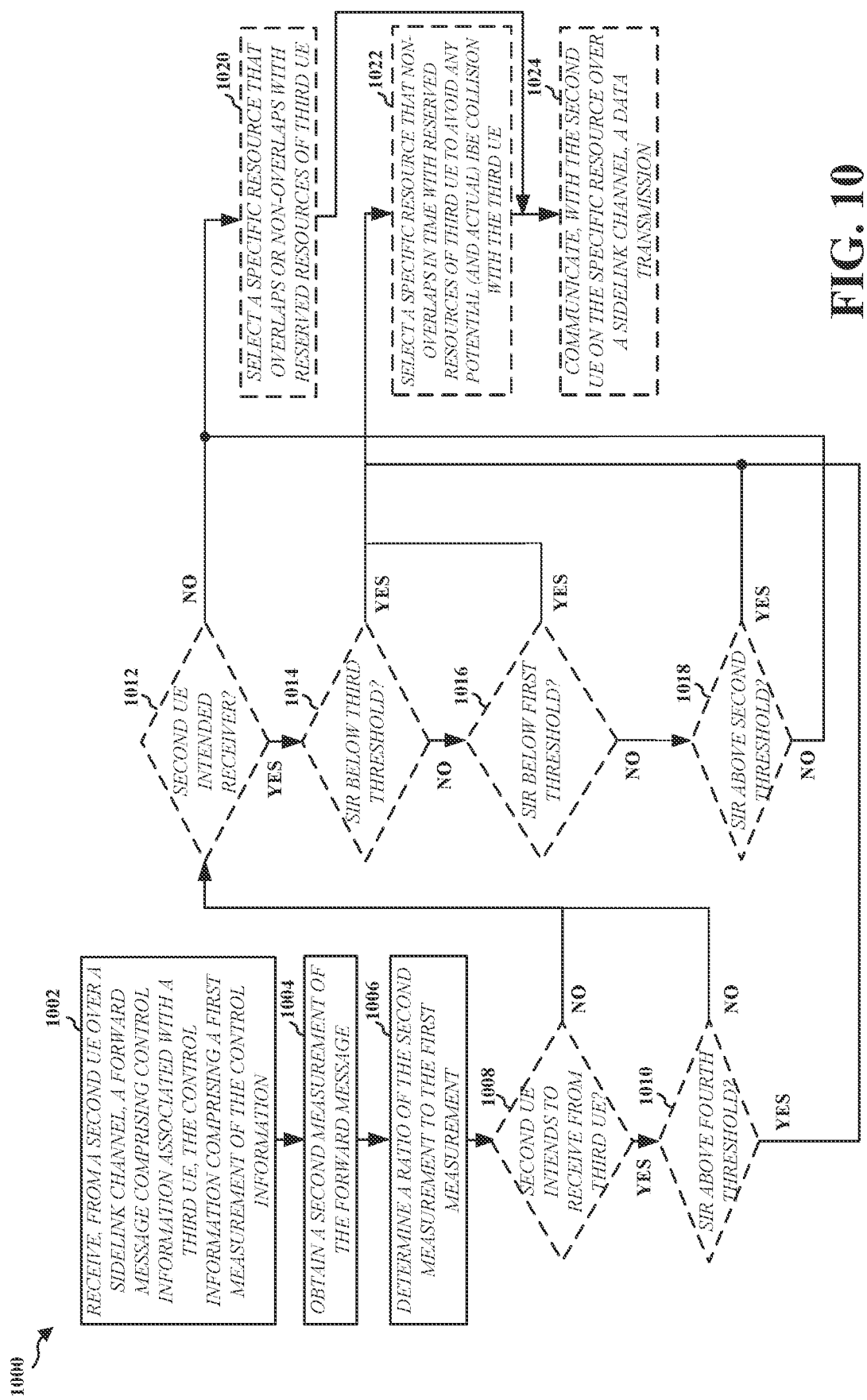
FIG. 10 is another example flowchart of a process of wireless communication at a forwarded UE including sidelink control information forwarding for sensing procedure, in accordance with aspects presented herein.

FIG. 10 is another example flowchart of a process 1000 of wireless communication at a forwarded UE including sidelink control information forwarding for sensing procedure, in accordance with aspects presented herein. The process 1000 may be performed by a wireless communication device (e.g., the UE 104, 502, 504, 506, 508; the device 410 or 450, the RSU 107, 507, which may include memory, a cellular baseband processor, and one or more components configured to perform the process 1000). As illustrated, the process 1000 includes a number of enumerated steps, but embodiments of the process 1000 may include additional steps before, after, and in between the enumerated steps. In some embodiments, one or more of the enumerated steps may be omitted or performed in a different order. Optional aspects are illustrated with a dashed line. The process 1000 enables a wireless communication device to forward the SCI of a first transmitter to a second transmitter that may be experiencing hidden node interference due to a NLOS path between the first transmitter and the second transmitter. Thus, the mechanism may increase reliability of sidelink resource sensing by facilitating the SCI forwarding. The process 1000 enables the wireless communication device to facilitate SCI forwarding in sidelink sensing procedures.

At 1002, a first wireless communication device may receive, from a second wireless communication device over a sidelink channel, a forward message comprising control information associated with a third wireless communication device, the control information comprising a first measurement of the control information. The first wireless communication device may receive the forward message, e.g., as described in connection with FIGS. 1-7D.

At 1004, the first wireless communication device may obtain a second measurement of the forward message. The first wireless communication device may obtain the second measurement, e.g., as described in connection with FIGS. 1-7D.

At 1006, the first wireless communication device may determine a ratio of the second measurement to the first measurement. The first wireless communication device may determine the ratio, e.g., as described in connection with FIGS. 1-7D.

At 1008, the first wireless communication device may determine whether second wireless communication device intends to receive from the third wireless communication device based on an indication in the control information when the ratio exceeds the first threshold. If the first wireless communication device determines that the second wireless communication device does intend to receive from the third wireless communication device, then the process 1000 proceeds to block 1010. Otherwise, if the second wireless communication device does not intend to receive from the third wireless communication device, then the process 1000 proceeds to block 1012.

At 1010, the first wireless communication device may determine whether the ratio exceeds a fourth threshold, when second wireless communication device intends to receive from third wireless communication device. If the first wireless communication device determines that the ratio is above the fourth threshold, then the process 1000 proceeds to block 1022. Otherwise, if the ratio is not above the fourth threshold, then the process 1000 proceeds to block 1012.

At 1012, the first wireless communication device may determine whether the second wireless communication device is the intended receiver for the first wireless communication device based on the receiver identifier of the second wireless communication device and the location information of the second wireless communication device. If the first wireless communication device determines that the second wireless communication device is the intended receiver, then the process 1000 proceeds to block 1014. Otherwise, if the second wireless communication device is not the intended receiver, then the process 1000 proceeds to block 1020.

At 1014, the first wireless communication device may determine whether the ratio does not exceed a third threshold when the second wireless communication device is the intended receiver for the first wireless communication device. If the first wireless communication device determines that the ratio is below the third threshold, then the process 1000 proceeds to block 1022. Otherwise, if the ratio is not below the third threshold, then the process 1000 proceeds to block 1016.

At 1016, the first wireless communication device may determine whether the ratio does not exceed a first threshold, when the ratio exceeds the third threshold. If the first wireless communication device determines that the ratio is below the first threshold, then the process 1000 proceeds to block 1022. Otherwise, if the ratio is not below the first threshold, then the process 1000 proceeds to block 1018.

At 1018, the first wireless communication device may determine whether the ratio exceeds a second threshold, when second wireless communication device intends to receive from third wireless communication device. If the first wireless communication device determines that the ratio is above the second threshold, then the process 1000 proceeds to block 1022. Otherwise, if the ratio is not above the second threshold, then the process 1000 proceeds to block 1020.

At 1020, the first wireless communication device may select the specific resource by selecting a resource that overlaps and/or non-overlaps with at least a portion of the resources from the reservation. The process 1000 proceeds from block 1020 to block 1024. At 1022, the first wireless communication device may select the specific resource by selecting one or more resources that do not overlap in time with the resources from the reservation to avoid any potential (and actual) IBE collision with the third wireless communication device. The process 1000 proceeds from block 1022 to block 1024. The first wireless communication device may select the specific resource, e.g., as described in connection with FIGS. 1-7D.

At 1024, the first wireless communication device may communicate, with the second wireless communication device on the specific resource over a sidelink channel, a data transmission. The first wireless communication device may communicate the data transmission, e.g., as described in connection with FIGS. 1-7D.

A wireless apparatus may include components that perform each of the blocks of the algorithm in the aforementioned flowchart of FIG. 10. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus for wireless communication may include means for performing any of the blocks of the process described in connection with FIG. 10. The aforementioned means may be one or more of the aforementioned components of the apparatus and/or a processing system of the apparatus configured to perform the functions recited by the aforementioned means. The processing system may include the TX processor 416, 468, the RX processor 470, 456, and the controller/processor 475, 459. As such, in one configuration, the aforementioned means may be the TX processor 416, 468, the RX processor 470, 456, and the controller/processor 475, 459 configured to perform the functions recited by the aforementioned means.

Figure 11:
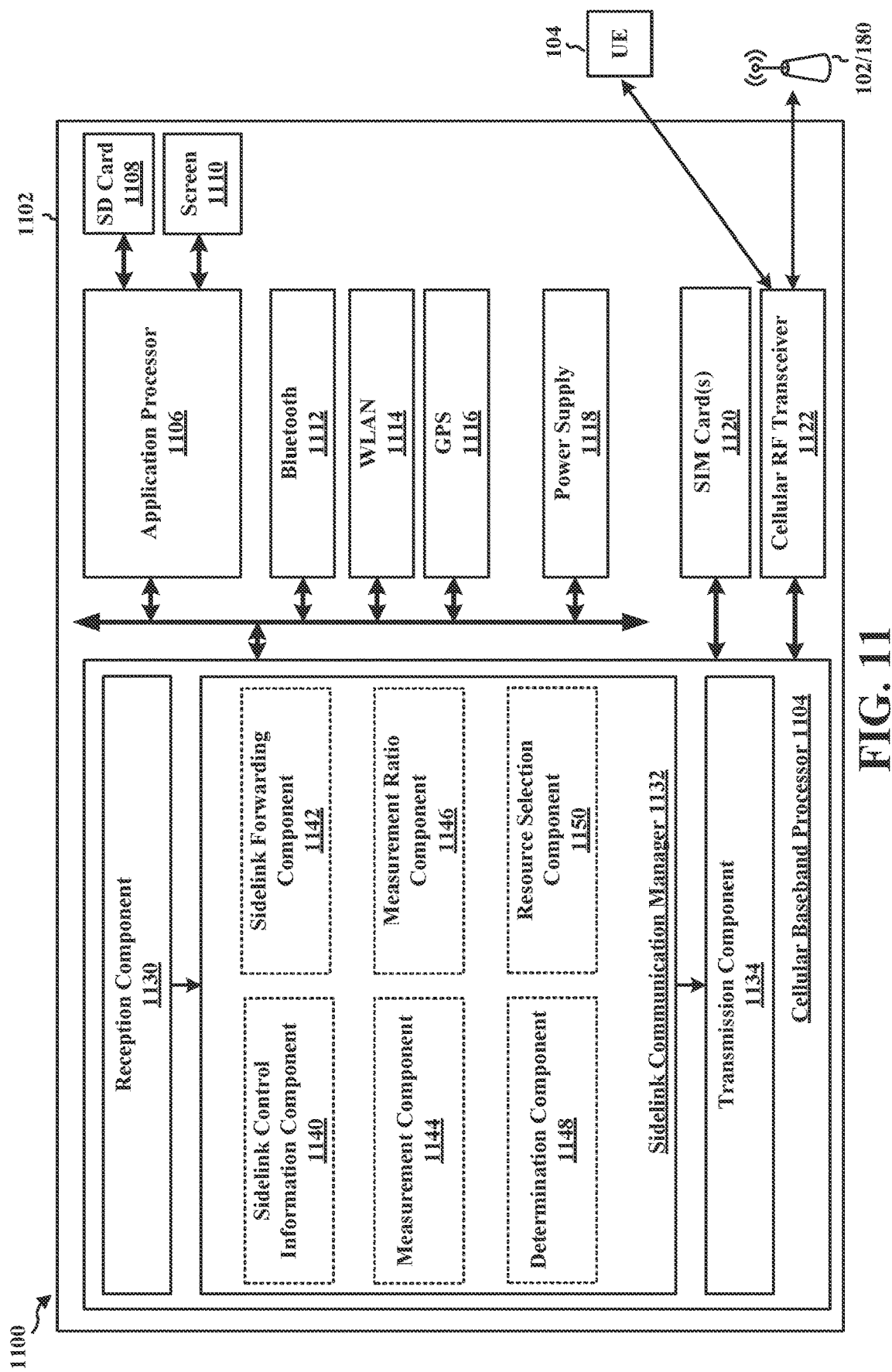
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE or other wireless device that communicates based on sidelink. The apparatus 1102 includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with other wireless devices, such as a UE 114 and/or base station 112/180. The cellular baseband processor 1104 may include a computer-readable medium/memory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a sidelink communication manager 1132, and a transmission component 1134. The sidelink communication manager 1132 includes the one or more illustrated components. The components within the sidelink communication manager 1132 may be stored in the computer-readable medium/memory and/or configured as hardware within the cellular baseband processor 1104. The cellular baseband processor 1104 may be a component of the device 410 or 450 and may include the memory 460 or 476 and/or at least one of the TX processor 416 or 468, the RX processor 456 or 470, and the controller/processor 459 or 475. In one configuration, the apparatus 1102 may be a modem chip and include just the baseband processor 1104, and in another configuration, the apparatus 1102 may be the entire wireless device (e.g., see the device 410 or 450 of FIG. 4) and include the additional modules of the apparatus 1102.

The sidelink communication manager 1132 includes a sidelink control information component 1140, a sidelink forwarding component 1142, a measurement component 1144, a measurement ratio component 1146, a determination component 1148, and/or a resource selection component 1150 configured to perform the aspects described in connection with methods in FIG. 8 and/or FIG. 9. The apparatus is illustrated as including components to perform the method of FIG. 8 and/or FIG. 9, because the wireless device may operate as a transmitting device at times and may operate as a receiving device at other times. In other examples, the apparatus 1102 may include components for the method of FIG. 8 without including components configured to perform the method of FIG. 9, or may include components for the method of FIG. 9 without including components configured to perform the method of FIG. 8.

The apparatus 1102 may include additional components that perform each of the blocks of the algorithm in the aforementioned flowcharts of FIGS. 8 and/or 9. As such, each block in the aforementioned flowcharts of FIGS. 8 and/or 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from a second UE over a sidelink channel, control information. The apparatus 1102 may further include means for transmitting, to a third UE over a sidelink channel, a forward message comprising the control information and information associated with the first UE.

The apparatus 1102 may further include means for receiving, from a second UE over a sidelink channel, a forward message comprising control information associated with a third UE, the control information comprising a first measurement of the control information. The apparatus 1102 may further include means for obtaining a second measurement of the forward message. The apparatus 1102 may further include means for determining a ratio of the second measurement to the first measurement. The apparatus 1102 may further include means for selecting a specific resource based on the ratio and a determination of whether the second UE is an intended receiver for the first UE or whether the second UE intends to receive from the third UE.

The aforementioned means may be one or more of the aforementioned components of the apparatus 1102 configured to perform the functions recited by the aforementioned means. As described supra, the apparatus 1102 may include the TX Processor 416 or 468, the RX Processor 456 or 470, and the controller/processor 459 or 475. As such, in one configuration, the aforementioned means may be the TX Processor 416 or 468, the RX Processor 456 or 470, and the controller/processor 459 or 475 configured to perform the functions recited by the aforementioned means.

The following aspects are illustrative only and aspects thereof may be combined with aspects of other examples or teaching described herein, without limitation.

Aspect 1 is a method of wireless communication at a first user equipment (UE), the method comprising: receiving, from a second UE over a sidelink channel, control information; and transmitting, to a third UE over a sidelink channel, a forward message comprising the control information and information associated with the first UE.

In Aspect 2, the method of Aspect 1 further includes that the information associated with the first UE comprises an indication of whether the first UE intends to receive from the second UE.

In Aspect 3, the method of Aspect 1 or Aspect 2 further includes that the information associated with the first UE comprises an estimated signal-to-interference ratio level when the indication indicates that the first UE intends to receive from the second UE.

In Aspect 4, the method of any of Aspects 1-3 further includes that the information associated with the first UE comprises a receiver identifier of the first UE.

In Aspect 5, the method of any of Aspects 1-4 further includes that the information associated with the first UE comprises location information of the first UE.

In Aspect 6, the method of any of Aspects 1-5 further includes obtaining one or more measurements of the control information; and transmitting the one or more measurements along with the control information.

In Aspect 7, the method of any of Aspects 1-6 further includes that the one or more measurements comprises one or more of a received signal strength indicator (RSSI) measurement, a reference signal received power (RSRP) measurement, a reference signal received quality (RSRQ) measurement, a signal-to-noise ratio (SNR), or a signal-to-interference-plus-noise ratio (SINR).

In Aspect 8, the method of any of Aspects 1-7 further includes receiving, from the third UE on a specific resource over a sidelink channel, a data transmission, the specific resource being based on the control information and information associated with the first UE.

Aspect 9 is a device including one or more processors and one or more memories in electronic communication with the one or more processors storing instructions executable by the one or more processors to cause the device to implement a method as in any of Aspects 1-8.

Aspect 10 is a system or apparatus including means for implementing a method or realizing an apparatus as in any of Aspects 1-8.

Aspect 11 is a non-transitory computer readable medium storing instructions executable by one or more processors to cause the one or more processors to implement a method as in any of Aspects 1-8.

Aspect 12 is a method of wireless communication at a first user equipment (UE), the method comprising: receiving, from a second UE over a sidelink channel, a forward message comprising control information associated with a third UE, the control information comprising a first measurement of the control information; obtaining a second measurement of the forward message; determining a ratio of the second measurement to the first measurement; and selecting a specific resource based on the ratio and a determination of whether the second UE is an intended receiver for the first UE or whether the second UE intends to receive from the third UE.

In Aspect 13, the method of Aspect 12 further includes that the control information comprises a receiver identifier of the second UE and location information of the second UE.

In Aspect 14, the method of Aspect 12 or Aspect 13 further includes determining whether the second UE is the intended receiver for the first UE based on the receiver identifier of the second UE and the location information of the second UE.

In Aspect 15, the method of any of Aspects 12-14 further includes determining whether the ratio does not exceed a third threshold when the second UE is the intended receiver for the first UE, wherein the control information indicates reservation of resources associated with the third UE, and wherein the selecting the specific resource comprises selecting one or more resources that do not overlap in time with the resources of the reservation when the ratio does not exceed the third threshold.

In Aspect 16, the method of any of Aspects 12-15 further includes determining whether the ratio does not exceed a first threshold different than the third threshold, when the ratio exceeds the third threshold, wherein the selecting the specific resource comprises selecting one or more resources that do not overlap with the resources of the reservation when the ratio does not exceed the first threshold.

In Aspect 17, the method of any of Aspects 12-16 further includes determining whether the second UE intends to receive from the third UE based on an indication in the control information when the ratio exceeds the first threshold; and determining whether the ratio exceeds a second threshold different than the first threshold and the third threshold, when the second UE intends to receive from the third UE, wherein the selecting the specific resource comprises: selecting one or more resources that do not overlap with the resources from the reservation when the ratio exceeds the second threshold, and selecting a resource including one or more resources that overlap with at least a portion of the resources from the reservation when the ratio does not exceed the second threshold or the second UE does not intend to receive from the third UE.

In Aspect 18, the method of any of Aspects 12-17 further includes receiving, from a base station over a downlink channel, a configuration; and determining at least one of the first threshold, the second threshold or the third threshold from at least a portion of the configuration.

In Aspect 19, the method of any of Aspects 12-18 further includes that at least one of the second threshold or the third threshold is based on a signal-to-noise ratio level to decode data signaling and associated modulation coding scheme information.

In Aspect 20, the method of any of Aspects 12-19 further includes that at least one of the second threshold or the third threshold is based on a signal-to-noise ratio level to decode control signaling In Aspect 21, the method of any of Aspects 12-20 further includes that the second threshold is a negated representation of the first threshold.

In Aspect 22, the method of any of Aspects 12-21 further includes that the third threshold is a delta dB below the first threshold.

In Aspect 23, the method of any of Aspects 12-14 further includes determining whether the second UE intends to receive from the third UE based on an indication in the control information when the second UE is not the intended receiver for the first UE; and determining whether the ratio exceeds a fourth threshold when the second UE intends to receive from the third UE, wherein the control information indicates reservation of resources associated with the third UE, and wherein the selecting the specific resource comprises selecting one or more resources that do not overlap in time with the resources of the reservation when the ratio exceeds the fourth threshold.

In Aspect 24, the method of Aspect 23 further includes determining whether the ratio exceeds a second threshold different than the fourth threshold, when the ratio does not exceed the fourth threshold, wherein the selecting the specific resource comprises: selecting one or more resources that do not overlap with the resources from the reservation when the ratio exceeds the second threshold, and selecting a resource including one or more resources that overlap with at least a portion of the resources from the reservation when the ratio does not exceed the second threshold.

In Aspect 25, the method of Aspect 23 or Aspect 24 further includes that the fourth threshold is a negated representation of the second threshold.

In Aspect 26, the method of any of Aspects 23-25 further includes that the control information indicates reservation of resources associated with the third UE, and the selecting comprises selecting a resource including one or more resources that overlap with at least a portion of the resources from the reservation, when the second UE does not intend to receive from the third UE.

In Aspect 27, the method of any of Aspects 23-26 further includes that the control information comprises an estimated signal-to-interference ratio level when the indication indicates that the second UE intends to receive from the third UE.

In Aspect 28, the method of any of Aspects 23-27 further includes obtaining the first measurement of the control information from the estimated signal-to-interference ratio level.

In Aspect 29, the method of any of Aspects 23-28 further includes determining the second threshold based on the estimated signal-to-interference ratio level; and determining the fourth threshold implicitly based on the second threshold.

In Aspect 30, the method of any of Aspects 23-29 further includes determining the second threshold and the fourth threshold based on the estimated signal-to-interference ratio level.

In Aspect 31, the method of any of Aspects 23-30 further includes receiving, from a base station over a downlink channel, a configuration; and determining the fourth threshold from at least a portion of the configuration.

In Aspect 32, the method of any of Aspects 23-31 further includes that the fourth threshold is based on a signal-to-noise ratio level to decode data signaling and associated modulation coding scheme information.

In Aspect 33, the method of any of Aspects 23-32 further includes that the fourth threshold is based on a signal-to-noise ratio level to decode control signaling.

In Aspect 34, the method of any of Aspects 23-33 further includes that the fourth threshold is a delta dB above the second threshold.

In Aspect 35, the method of Aspect 12 further includes determining whether the second UE intends to receive from the third UE based on an indication in the control information; and determining whether the ratio does not exceed a third threshold when the second UE does not intend to receive from the third UE, wherein the control information indicates reservation of resources associated with the third UE, and wherein the selecting the specific resource comprises selecting one or more resources that do not overlap in time with the resources of the reservation when the ratio does not exceed the third threshold.

In Aspect 36, the method of Aspect 35 further includes determining whether the ratio does not exceed a first threshold different than the third threshold, when the ratio exceeds the third threshold, wherein the selecting the specific resource comprises selecting one or more resources that do not overlap with the resources of the reservation when the ratio does not exceed the first threshold.

In Aspect 37, the method of Aspect 35 or Aspect 36 further includes that the control information comprises a receiver identifier of the second UE and location information of the second UE, further comprising: determining whether the second UE is the intended receiver for the first UE based on the receiver identifier of the second UE and the location information of the second UE, when the ratio exceeds the first threshold; and determining whether the ratio exceeds a second threshold different than the first threshold and the third threshold, when the second UE is the intended receiver for the first UE, wherein the selecting the specific resource comprises: selecting one or more resources that do not overlap with the resources from the reservation when the ratio exceeds the second threshold, and selecting a resource including one or more resources that overlap with at least a portion of the resources from the reservation when the ratio does not exceed the second threshold.

In Aspect 38, the method of any of Aspects 35-37 further includes determining whether the second UE is the intended receiver for the first UE when the second UE does not intend to receive from the third UE; and determining whether the ratio exceeds a fourth threshold when the second UE is the intended receiver for the first UE, wherein the control information indicates reservation of resources associated with the third UE, and wherein the selecting the specific resource comprises selecting one or more resources that do not overlap in time with the resources of the reservation when the ratio exceeds the fourth threshold.

In Aspect 39, the method of any of Aspects 35-38 further includes determining whether the ratio exceeds a second threshold different than the fourth threshold, when the ratio does not exceed the fourth threshold, wherein the selecting the specific resource comprises: selecting one or more resources that do not overlap with the resources from the reservation when the ratio exceeds the second threshold, and selecting a resource including one or more resources that overlap with at least a portion of the resources from the reservation when the ratio does not exceed the second threshold.

In Aspect 40, the method of any of Aspects 12-39 further includes communicating, with the second UE on the specific resource over a sidelink channel, a data transmission.

In Aspect 41, the method of any of Aspects 12-40 further includes that the first measurement comprises a first reference signal received power (RSRP) value, the second measurement comprises a second RSRP value, and the ratio comprises a signal-to-interference ratio (SIR) value that corresponds to the ratio of the second RSRP value to the first RSRP value.

Aspect 42 is a device including one or more processors and one or more memories in electronic communication with the one or more processors storing instructions executable by the one or more processors to cause the device to implement a method as in any of Aspects 12-41.

Aspect 43 is a system or apparatus including means for implementing a method or realizing an apparatus as in any of Aspects 12-41.

Aspect 44 is a non-transitory computer readable medium storing instructions executable by one or more processors to cause the one or more processors to implement a method as in any of Aspects 12-41.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), the method comprising:
receiving, from a second UE over a sidelink channel, a forward message comprising control information associated with a third UE, the control information comprising a first measurement of the control information;
obtaining a second measurement of the forward message;
determining a ratio of the second measurement to the first measurement; and
selecting a specific resource based on the ratio and a determination of whether the second UE is an intended receiver for the first UE or whether the second UE intends to receive from the third UE.

2. The method of claim 1, further comprising communicating, with the second UE on the specific resource over a sidelink channel, a data transmission.

3. The method of claim 1, wherein the control information comprises a receiver identifier of the second UE and location information of the second UE,
further comprising:
determining whether the second UE is the intended receiver for the first UE based on the receiver identifier of the second UE and the location information of the second UE.

4. The method of claim 3, further comprising:
determining whether the ratio does not exceed a third threshold when the second UE is the intended receiver for the first UE,
wherein the control information indicates a reservation of resources associated with the third UE, and
wherein the selecting the specific resource comprises selecting one or more resources that do not overlap in time with the resources of the reservation when the ratio does not exceed the third threshold.

5. The method of claim 4, further comprising:
determining whether the ratio does not exceed a first threshold different than the third threshold, when the ratio exceeds the third threshold,
wherein the selecting the specific resource comprises selecting one or more resources that do not overlap with the resources of the reservation when the ratio does not exceed the first threshold.

6. The method of claim 5, wherein the third threshold is a delta dB below the first threshold.

7. The method of claim 5, further comprising:
determining whether the second UE intends to receive from the third UE based on an indication in the control information when the ratio exceeds the first threshold; and
determining whether the ratio exceeds a second threshold different than the first threshold and the third threshold, when the second UE intends to receive from the third UE,
wherein the selecting the specific resource comprises:
selecting one or more resources that do not overlap with the resources from the reservation when the ratio exceeds the second threshold, and
selecting a resource including one or more resources that overlap with at least a portion of the resources from the reservation when the ratio does not exceed the second threshold or the second UE does not intend to receive from the third UE.

8. The method of claim 7, wherein one or more of:
at least one of the second threshold or the third threshold is based on a signal-to-noise ratio level to decode data signaling and associated modulation coding scheme informations;
at least one of the second threshold or the third threshold is based on a signal-to-noise ratio level to decode control signaling; or
the second threshold is a negated representation of the first threshold.

9. The method of claim 3, further comprising:
determining whether the second UE intends to receive from the third UE based on an indication in the control information when the second UE is not the intended receiver for the first UE; and
determining whether the ratio exceeds a fourth threshold when the second UE intends to receive from the third UE,
wherein the control information indicates a reservation of resources associated with the third UE, and
wherein the selecting the specific resource comprises selecting one or more resources that do not overlap in time with the resources of the reservation when the ratio exceeds the fourth threshold.

10. The method of claim 9, further comprising:
determining whether the ratio exceeds a second threshold different than the fourth threshold, when the ratio does not exceed the fourth threshold,
wherein the selecting the specific resource comprises:
selecting one or more resources that do not overlap with the resources from the reservation when the ratio exceeds the second threshold, and
selecting a resource including one or more resources that overlap with at least a portion of the resources from the reservation when the ratio does not exceed the second threshold.

11. The method of claim 10, wherein the fourth threshold is a negated representation of the second threshold or the fourth threshold is a delta dB above the second threshold.

12. The method of claim 10, wherein the control information comprises an estimated signal-to-interference ratio level when the indication indicates that the second UE intends to receive from the third UE, the method further comprising one or more of:
- obtaining the first measurement of the control information from the estimated signal-to-interference ratio level;
- determining the second threshold based on the estimated signal-to-interference ratio level and determining the fourth threshold implicitly based on the second threshold; or
- determining the second threshold and the fourth threshold based on the estimated signal-to-interference ratio level.

13. The method of claim 9, wherein:
- the control information indicates a reservation of resources associated with the third UE, and
- the selecting comprises selecting a resource including one or more resources that overlap with at least a portion of the resources from the reservation, when the second UE does not intend to receive from the third UE.

14. The method of claim 9, wherein the fourth threshold is based on a signal-to-noise ratio level to decode data signaling and associated modulation coding scheme information or the fourth threshold is based on a signal-to-noise ratio level to decode control signaling.

15. The method of claim 1, further comprising:
- determining whether the second UE intends to receive from the third UE based on an indication in the control information; and
- determining whether the ratio does not exceed a third threshold when the second UE does not intend to receive from the third UE,
- wherein the control information indicates a reservation of resources associated with the third UE, and
- wherein the selecting the specific resource comprises selecting one or more resources that do not overlap in time with the resources of the reservation when the ratio does not exceed the third threshold.

16. The method of claim 15, further comprising:
- determining whether the ratio does not exceed a first threshold different than the third threshold, when the ratio exceeds the third threshold,
- wherein the selecting the specific resource comprises selecting one or more resources that do not overlap with the resources of the reservation when the ratio does not exceed the first threshold.

17. The method of claim 16, wherein the control information comprises a receiver identifier of the second UE and location information of the second UE,
further comprising:
- determining whether the second UE is the intended receiver for the first UE based on the receiver identifier of the second UE and the location information of the second UE, when the ratio exceeds the first threshold; and
- determining whether the ratio exceeds a second threshold different than the first threshold and the third threshold, when the second UE is the intended receiver for the first UE,
wherein the selecting the specific resource comprises:
- selecting one or more resources that do not overlap with the resources from the reservation when the ratio exceeds the second threshold, and
- selecting a resource including one or more resources that overlap with at least a portion of the resources from the reservation when the ratio does not exceed the second threshold.

18. The method of claim 15, further comprising:
- determining whether the second UE is the intended receiver for the first UE when the second UE does not intend to receive from the third UE; and
- determining whether the ratio exceeds a fourth threshold when the second UE is the intended receiver for the first UE,
- wherein the control information indicates a reservation of resources associated with the third UE, and
- wherein the selecting the specific resource comprises selecting one or more resources that do not overlap in time with the resources of the reservation when the ratio exceeds the fourth threshold.

19. The method of claim 18, further comprising:
- determining whether the ratio exceeds a second threshold different than the fourth threshold, when the ratio does not exceed the fourth threshold,
wherein the selecting the specific resource comprises:
- selecting one or more resources that do not overlap with the resources from the reservation when the ratio exceeds the second threshold, and
- selecting a resource including one or more resources that overlap with at least a portion of the resources from the reservation when the ratio does not exceed the second threshold.

20. An apparatus for wireless communication at a first user equipment (UE) for discovery of at least one other UE, the apparatus comprising:
- at least one processor;
- a transceiver; and
- a memory, coupled to the at least one processor and the transceiver, storing instructions, which when executed by the at least one processor, cause the apparatus to:
  - receive, from a second UE over a sidelink channel, a forward message comprising control information associated with a third UE, the control information comprising a first measurement of the control information;
  - obtain a second measurement of the forward message;
  - determine a ratio of the second measurement to the first measurement; and
  - select a specific resource based on the ratio and a determination of whether the second UE is an intended receiver for the first UE or whether the second UE intends to receive from the third UE.

21. The apparatus of claim 20, wherein the memory further stores instructions which cause the apparatus to communicate, with the second UE on the specific resource over a sidelink channel, a data transmission.

22. The apparatus of claim 20, wherein the control information comprises a receiver identifier of the second UE and location information of the second UE,
wherein the memory further stores instructions which cause the apparatus to:
- determine whether the second UE is the intended receiver for the first UE based on the receiver identifier of the second UE and the location information of the second UE.

23. The apparatus of claim 22, wherein the memory further stores instructions which cause the apparatus to:
- determine whether the ratio does not exceed a third threshold when the second UE is the intended receiver for the first UE,
- wherein the control information indicates a reservation of resources associated with the third UE, and
- wherein the selecting the specific resource comprises selecting one or more resources that do not overlap in time with the resources of the reservation when the ratio does not exceed the third threshold.

24. The apparatus of claim 23, wherein the memory further stores instructions which cause the apparatus to:
   determine whether the ratio does not exceed a first threshold different than the third threshold, when the ratio exceeds the third threshold,
   wherein the selecting the specific resource comprises selecting one or more resources that do not overlap with the resources of the reservation when the ratio does not exceed the first threshold.

25. The apparatus of claim 24, wherein the third threshold is a delta dB below the first threshold.

26. The apparatus of claim 24, wherein the memory further stores instructions which cause the apparatus to:
   determine whether the second UE intends to receive from the third UE based on an indication in the control information when the ratio exceeds the first threshold; and
   determine whether the ratio exceeds a second threshold different than the first threshold and the third threshold, when the second UE intends to receive from the third UE,
   wherein the instructions cause the apparatus to select the specific resource by:
      selecting one or more resources that do not overlap with the resources from the reservation when the ratio exceeds the second threshold, and
      selecting a resource including one or more resources that overlap with at least a portion of the resources from the reservation when the ratio does not exceed the second threshold or the second UE does not intend to receive from the third UE.

27. The apparatus of claim 26, wherein one or more of:
   at least one of the second threshold or the third threshold is based on a signal-to-noise ratio level to decode data signaling and associated modulation coding scheme information;
   at least one of the second threshold or the third threshold is based on a signal-to-noise ratio level to decode control signaling; or
   the second threshold is a negated representation of the first threshold.

28. The apparatus of claim 22, wherein the memory further stores instructions which cause the apparatus to:
   determine whether the second UE intends to receive from the third UE based on an indication in the control information when the second UE is not the intended receiver for the first UE; and
   determine whether the ratio exceeds a fourth threshold when the second UE intends to receive from the third UE,
   wherein the control information indicates a reservation of resources associated with the third UE, and
   wherein the selecting the specific resource comprises selecting one or more resources that do not overlap in time with the resources of the reservation when the ratio exceeds the fourth threshold.

29. The apparatus of claim 28, wherein the memory further stores instructions which cause the apparatus to:
   determine whether the ratio exceeds a second threshold different than the fourth threshold, when the ratio does not exceed the fourth threshold,
   wherein the instructions cause the apparatus to select the specific resource by:
      selecting one or more resources that do not overlap with the resources from the reservation when the ratio exceeds the second threshold, and
      selecting a resource including one or more resources that overlap with at least a portion of the resources from the reservation when the ratio does not exceed the second threshold.

30. The apparatus of claim 29, wherein the fourth threshold is a negated representation of the second threshold or the fourth threshold is a delta dB above the second threshold.

31. The apparatus of claim 29, wherein the control information comprises an estimated signal-to-interference ratio level when the indication indicates that the second UE intends to receive from the third UE, the instructions cause the apparatus to one or more of:
   obtain the first measurement of the control information from the estimated signal-to-interference ratio level;
   determine the second threshold based on the estimated signal-to-interference ratio level and determining the fourth threshold implicitly based on the second threshold; or
   determine the second threshold and the fourth threshold based on the estimated signal-to-interference ratio level.

32. The apparatus of claim 28, wherein:
   the control information indicates a reservation of resources associated with the third UE, and
   the instructions cause the apparatus to the specific resource by selecting a resource including one or more resources that overlap with at least a portion of the resources from the reservation, when the second UE does not intend to receive from the third UE.

33. The apparatus of claim 28, wherein the fourth threshold is based on a signal-to-noise ratio level to decode data signaling and associated modulation coding scheme information or the fourth threshold is based on a signal-to-noise ratio level to decode control signaling.

34. The apparatus of claim 20, wherein the memory further stores instructions which cause the apparatus to:
   determine whether the second UE intends to receive from the third UE based on an indication in the control information; and
   determine whether the ratio does not exceed a third threshold when the second UE does not intend to receive from the third UE,
   wherein the control information indicates a reservation of resources associated with the third UE, and
   wherein the selecting the specific resource comprises selecting one or more resources that do not overlap in time with the resources of the reservation when the ratio does not exceed the third threshold.

35. The apparatus of claim 34, wherein the memory further stores instructions which cause the apparatus to:
   determine whether the ratio does not exceed a first threshold different than the third threshold, when the ratio exceeds the third threshold, wherein the selecting the specific resource comprises selecting one or more resources that do not overlap with the resources of the reservation when the ratio does not exceed the first threshold.

36. The apparatus of claim 35, wherein the control information comprises a receiver identifier of the second UE and location information of the second UE, wherein the memory further stores instructions which cause the apparatus to:
   determine whether the second UE is the intended receiver for the first UE based on the receiver identifier of the second UE and the location information of the second UE, when the ratio exceeds the first threshold; and
   determine whether the ratio exceeds a second threshold different than the first threshold and the third threshold, when the second UE is the intended receiver for the first UE,
wherein the instructions cause the apparatus to select the specific resource by:
   selecting one or more resources that do not overlap with the resources from the reservation when the ratio exceeds the second threshold, and
   selecting a resource including one or more resources that overlap with at least a portion of the resources from the reservation when the ratio does not exceed the second threshold.

37. The apparatus of claim 34, wherein the memory further stores instructions which cause the apparatus to:
   determine whether the second UE is the intended receiver for the first UE when the second UE does not intend to receive from the third UE; and
   determine whether the ratio exceeds a fourth threshold when the second UE is the intended receiver for the first UE,
wherein the control information indicates a reservation of resources associated with the third UE, and
wherein the selecting the specific resource comprises selecting one or more resources that do not overlap in time with the resources of the reservation when the ratio exceeds the fourth threshold.

38. The apparatus of claim 37, wherein the memory further stores instructions which cause the apparatus to:
   determine whether the ratio exceeds a second threshold different than the fourth threshold, when the ratio does not exceed the fourth threshold,
wherein the instructions cause the apparatus to select the specific resource by:
   selecting one or more resources that do not overlap with the resources from the reservation when the ratio exceeds the second threshold, and
   selecting a resource including one or more resources that overlap with at least a portion of the resources from the reservation when the ratio does not exceed the second threshold.

* * * * *